US011636625B2

(12) United States Patent
Turner et al.

(10) Patent No.: US 11,636,625 B2
(45) Date of Patent: Apr. 25, 2023

(54) IMAGE COMPRESSION AND DECOMPRESSION

(71) Applicant: QUALCOMM incorporated, San Diego, CA (US)

(72) Inventors: Andrew Edmund Turner, San Diego, CA (US); Prashant Dinkar Karandikar, Pune (IN)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 17/118,723

(22) Filed: Dec. 11, 2020

(65) Prior Publication Data

US 2022/0189068 A1 Jun. 16, 2022

(51) Int. Cl.
  *G06T 9/00* (2006.01)
  *H04W 84/04* (2009.01)
  *G06T 3/40* (2006.01)
  *H04L 65/75* (2022.01)

(52) U.S. Cl.
  CPC .................. *G06T 9/00* (2013.01); *G06T 3/40* (2013.01); *H04L 65/75* (2022.05); *H04W 84/04* (2013.01)

(58) Field of Classification Search
  CPC . G06T 9/00; G06T 3/40; H04L 65/75; H04W 84/04
  See application file for complete search history.

(56) References Cited

U.S. PATENT DOCUMENTS

| 9,798,496 B2 * | 10/2017 | Varghese | G06F 3/0689 |
| 10,579,591 B1 * | 3/2020 | Diamant | G06F 16/1727 |
| 11,068,757 B2 * | 7/2021 | Strong | G06V 10/96 |
| 11,334,063 B2 * | 5/2022 | Cella | H04L 1/18 |
| 2009/0190760 A1 * | 7/2009 | Bojinov | G06F 3/0676 380/269 |
| 2010/0174879 A1 * | 7/2010 | Pawar | G06F 3/0608 711/170 |

(Continued)

FOREIGN PATENT DOCUMENTS

CN 100452010 C * 1/2009 ......... G06F 17/5077

OTHER PUBLICATIONS

White, Richard L., et al. "Tiled image convention for storing compressed images in fits binary tables." arXiv preprint arXiv:1201.1336 (2012). (Year: 2012).*

(Continued)

*Primary Examiner* — Charles T Shedrick
(74) *Attorney, Agent, or Firm* — The Marbury Law Group/Qualcomm

(57) ABSTRACT

Embodiments include methods for image compression and decompression. A sending computing device may determine a type of packing used for a chunk of image data, generate metadata describing the type of packing used for the chunk of image data, pack the chunk of image data according to the determined type of packing, and send the packed chunk of image data and the metadata to a second computing device. A receiving computing device may decode the metadata describing the type of packing used for the chunk of image data, determine the type of packing used for the chunk of image data based on the decoded metadata, and unpack the chunk of image data according to the determined type of packing used for the chunk of image data.

30 Claims, 14 Drawing Sheets

(56) References Cited

U.S. PATENT DOCUMENTS

| | | | |
|---|---|---|---|
| 2012/0242788 A1* | 9/2012 | Chuang | G08B 13/19626 |
| | | | 348/E7.001 |
| 2014/0081926 A1* | 3/2014 | Adams | G06F 16/51 |
| | | | 707/692 |
| 2017/0083262 A1* | 3/2017 | Gadelrab | G06F 3/0661 |
| 2017/0345186 A1* | 11/2017 | Seiler | G06T 11/40 |
| 2018/0075574 A1* | 3/2018 | Brennan | H04N 19/593 |
| 2019/0066352 A1* | 2/2019 | Kazakov | G06T 1/60 |
| 2019/0087930 A1* | 3/2019 | Gruber | G06F 12/0875 |
| 2020/0105021 A1* | 4/2020 | Sohre | G06T 1/60 |
| 2020/0372603 A1* | 11/2020 | Rangan | G06T 15/04 |
| 2021/0358174 A1* | 11/2021 | Pillai | G06T 1/60 |
| 2022/0051476 A1* | 2/2022 | Woop | G06T 3/4007 |
| 2022/0084156 A1* | 3/2022 | Kothandaraman | G06F 16/907 |

OTHER PUBLICATIONS

R. P. Brent, A linear algorithm for data compression, Australian Computer Journal 19, (May 2, 1987), 64-68. Presented at the tenth Australian Computer Science Conference, Deakin University, Geelong, Feb. 1987. Preliminary version appeared as Technical Report TR-CS-86-10, (Year: 1987).*

* cited by examiner

IMAGE COMPRESSION AND DECOMPRESSION

BACKGROUND

Image compression and decompression techniques facilitate the transmission of large images over communication networks. Many image compressions schemes are tiled. In such schemes, pixels of a certain width and height are combined together in a compression block. Two dimensional pixels may be grouped together. Tiled compression may be particularly useful for applications such as texturing, rendering, and object detection. However, some processors may be configured to access images in a linear manner. Tiled access requires such cores to store unrequested lines in a memory such as a line buffer for later processing. Such schemes may increase an area cost and complexity of processing.

SUMMARY

Various aspects include systems and methods of image compression and decompression that may be performed by a processor of a computing device. In some embodiments, the various systems and methods of image compression may be applied to a variety of access techniques, including tiled and linear.

Various aspects may include determining a type of packing used for a chunk of image data, generating metadata describing the type of packing used for the chunk of image data, packing the chunk of image data according to the determined type of packing, and sending the packed chunk of image data and the metadata to a second computing device. In some aspects, describing the type of packing used for the chunk of image data may enable the chunk of image data to be read independently of a second chunk of image data. In some aspects, the metadata describing the type of packing used for the chunk of image data may enable the chunk of image data to be written tiled and read linearly. In some aspects, generating metadata describing the type of packing used for the chunk of image data may include generating metadata indicating whether the chunk of image data is compressed or uncompressed.

In some aspects, packing the chunk of image data according to the determined type of packing may include compressing the chunk of image data according to the determined type of packing. In some aspects, packing the chunk of image data according to the determined type of packing may include packing the chunk of image data into one or more blocks. In some aspects, generating metadata describing the type of packing used for the chunk of image data may include generating metadata indicating a zone offset of a zone in which a block is grouped, and packing the chunk of image data according to the determined type of packing may include grouping the block into the zone.

In some aspects, generating metadata describing the type of packing used for the chunk of image data may include generating metadata indicating a zone size of a zone in which a block is grouped. In some aspects, generating metadata describing the type of packing used for the chunk of image data may include generating metadata indicating a block offset of the one or more blocks in a zone. In some aspects, generating metadata describing the type of packing used for the chunk of image data may include generating metadata indicating a number of blocks in a zone. In some aspects, generating metadata describing the type of packing used for the chunk of image data may include generating metadata indicating a location of a header in a zone. In some aspects, generating metadata describing the type of packing used for the chunk of image data may include generating metadata indicating that a block header includes an offset field.

Various aspects may include decoding metadata describing a type of packing used for a chunk of image data, determining the type of packing used for the chunk of image data based on the decoded metadata, and unpacking the chunk of image data according to the determined type of packing used for the chunk of image data. In some aspects, unpacking the chunk of image data according to the determined type of packing used for the chunk of image data may include reading the chunk of image data independently of a second chunk of image data. In some aspects, unpacking the chunk of image data according to the determined type of packing used for the chunk of image data may include reading the chunk of image data linearly wherein the chunk of image data was written tiled. In some aspects, determining the type of packing used for a chunk of image data based on the decoded metadata may include identifying a block in which the chunk of image data is packed. In some aspects, determining the type of packing used for a chunk of image data based on the decoded metadata may include identifying a zone including the block in which the chunk of image data is packed.

In some aspects, identifying the zone including the block in which the chunk of image data is packed may include identifying a zone offset or zone size. In some aspects, identifying the zone including the block in which the chunk of image data is packed may include identifying a block offset of the block in the zone. In some aspects, identifying the zone including the block in which the chunk of image data is packed may include identifying a number of blocks in the zone. In some aspects, identifying the zone including the block in which the chunk of image data is packed may include identifying a location of a block header in the zone. In some aspects, identifying the zone including the block in which the chunk of image data is packed may include identifying that a block header includes an offset field.

Further aspects may include a computing device having a processor configured to perform one or more operations of any of the methods summarized above. Further aspects may include a non-transitory processor-readable storage medium having stored thereon processor-executable instructions configured to cause a processor of a computing device to perform operations of any of the methods summarized above. Further aspects include a computing device having means for performing functions of any of the methods summarized above. Further aspects include a system on chip for use in a computing device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
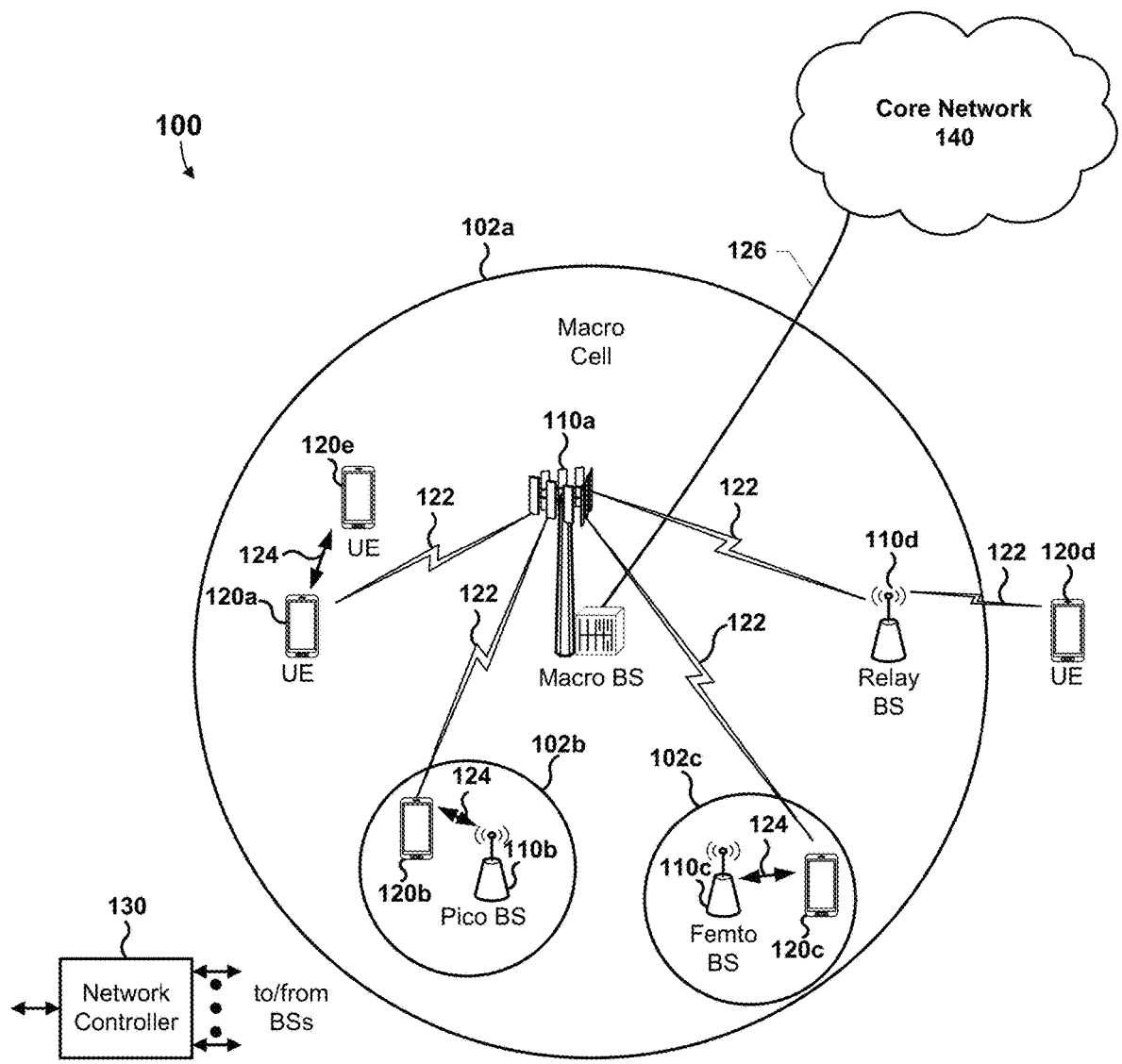
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems and methods for managing data compression and decompression of image data to facilitate their transmission between computing devices. Various embodiments may improve the efficiency and utility of computing devices and communication networks by increasing compatibility between tiled and un-tiled (e.g., linear) compression schemes, enabling selection of data compression methods that best suit a chunk of data and/or the computing devices transmitting and receiving such data.

The term "computing device" is used herein to refer to any one or all of wireless or wired router devices, server devices, and other elements of a communication network, wireless or wired appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "packing" is used herein to refer to data compression techniques used to reduce the number of bits of information to store and/or transmit digital information, such as image data or a data stream of multimedia data, so that the original digital information can be recovered via decompression (sometimes referred to herein as "unpacking") without substantial reduction in the quality or fidelity of the original data. Image compression (i.e., image data packing) is widely used in the telecommunication industry and a number of data compression or packing techniques are known and used. There are a number of known data packing techniques, and references herein to "type of packing" refers to the particular packing or data compression used for a chunk of data, which may include tiled types of packing techniques that compress data in terms of tiles or linear types of data packing techniques that compress data in a linear manner.

Many image compression or data packing schemes involved packing the data in tiles. For example, image data involving pixels of a certain width and height may be combined together into a compression block. Two-dimensional (2D) pixels are frequently together in a data stream, and so suitable for combining in a compression block. Tiled data packing techniques have advantages for some purposes, such as texturing, rendering and object detection. However, some processors used in transmitting or receiving computing devices may be configured such that linear data packing techniques are processed (compressed or decompressed) more efficiently using line buffers. For example, tiled data packing techniques may require a processor to store unrequested lines of data until requested, while linear data packing techniques enable addressing this issue using line buffers, which may reduce complexity and dedicated area on the integrated circuit. Thus, in a given data stream, some portions or the data, referred to herein as "chunks," may be better handled in communicating the data between two computing devices using one type of packing (e.g., using a tiled packing technique), while different chunks of the data stream may be better handled in communicating the data between the two computing devices using a different type of packing (e.g., using a linear packing technique). However, conventional data compression techniques used in transmitting image (and other types of data) communicate the entire data stream using a single packing technique, because the transmitting (i.e., compressing) computing device and the receiving (i.e., decompressing) computing device negotiate the packing technique prior to transmission of the data stream.

Various embodiments include methods and computing devices configured to perform the methods that employ an ambidirectional compression scheme that enables the transmitting computing device to change the type of packing used in transmitting data, such as image data, in midstream for selected chucks, thereby enabling either tile or untiled data compression schemes to be used as appropriate for individual data chunks within the data stream. Various embodiments may include determining a type of packing to be used for a chunk of image data, generating metadata describing the type of packing used for the chunk of image data, packing the chunk of image data according to the determined type of packing, and sending the packed chunk of image data and the metadata to a second computing device. In some embodiments, the computing device may analyze a chunk of image data for compressibility, determine a type of packing suitable for the chunk of image data, determine the metadata describing the type of packing used for the chunk of image data, and compress the chunk (or add the chunk uncompressed) into the determined space according to the determined type of packing. A second computing device receiving the packed data may decode the metadata describing the type of packing used for the chunk of image data, determine the type of packing used for the chunk of image data based on the decoded metadata, and unpack the chunk of image data according to the determined type of packing used for the chunk of image data. In some embodiments, the metadata describing the type of packing used for the chunk of image data may enable a chunk of image data to be read independently of a second chunk of image data. In some embodiments, the metadata describing the type of packing used for the chunk of image data may enable the chunk of image data to be written tiled and read linearly (or other combinations both static and dynamic).

Various embodiments may be implemented in software, firmware, hardware (e.g., circuitry), or a combination of software and hardware, which are configured to perform particular operations or functions. Some embodiments may be implemented in hardware configured to perform operations or functions, with or without executing instructions. Some embodiments may be implemented in a data port, a system on chip (SOC), a network on-chip (NOC), or another suitable implementation.

While the following examples and embodiments are described with reference to specific amounts of data or sizes of data groupings, such amounts or sizes are examples used for the purposes of illustration, and while useful in many applications and implementations, are not intended to be limiting. For example, a processor of a computing device may read image data in 64-byte chunks, and compress or decompress each 64-byte chunk individually. In some cases, a 64-byte chunk may not be compressed. In such embodiments, the computing device may store each chunk in a 32-byte block for encoding and decoding. Blocks may be grouped into zones of 32 or 64 bytes aligned to a 32-byte block. The computing device may generate metadata to describe the packing of the image data. In some embodiments, the computing device may generate metadata indicating whether the image data (e.g., a chunk of image data) is compressed or uncompressed. In some embodiments, packing the chunk of image data according to the determined type of packing may include compressing the chunk of image data according to the determined type of packing. In some embodiments, packing the chunk of image data according to the determined type of packing may include packing the chunk of image data into one or more blocks.

In various embodiments, the generated metadata may include information about the location of blocks to enable a receiving computing device to request a single request for image data (e.g., for unpacking). In some embodiments, the metadata may include location information for one or more headers in the packed image data. In some embodiments, the metadata may be generated and transmitted in a data structure separate from the image data. In some embodiments, the metadata may include information describing each 64-byte chunk of image data, to enable a computing device to access each 64-byte chunk from a 32 byte or a 64-byte block.

Various embodiments may be employed by a tiled writer or a non-tiled writer (e.g., a linear writer). In various embodiments, data written by a tiled writer may be read by a non-tiled writer, and vice versa. In some embodiments, a 64×1 reader may have a maximum compression (for example, 2:1) that may be increased opportunistically by a cache memory behind a decoder. In some embodiments, a buffer may support both tile and linear writing at a course level by tiling at the least common region of the tiled and linear shapes (e.g. 256 bytes×4 lines). In some embodiments, the metadata may include direction information (which, in some embodiments, may be a bit) that indicates a direction of each tile. For example, the direction information may indicate a vertical access direction (e.g., 64×4 high for vertical access) or a horizontal access direction (e.g., 64×4 long for horizontal access). In some embodiments, the metadata may include write information (which, in some embodiments, may be a bit) that indicates whether a tile has been written, enabling the writer to choose a direction. For example, a tile direction may be set when a least common region is written for the first time, or completely. In some embodiments, when a least common region has not yet been written, the write information may indicate when a writer may select a new direction. In some embodiments, the write information may include a plurality of bits that may be used to implement a versioning scheme.

Various embodiments may be employed with any compression algorithm. In some embodiments, a compression algorithm may be adapted to compress a 64-byte block into one or two aligned 32-byte blocks. The computing device may include in the metadata information enabling the determination of the start of each chunk of data within a block. In some embodiments, the metadata may include an offset value that indicates a start of a chunk of data within a block relative to the beginning of the block.

In some embodiments, the computing device may combine header information for different chunks or for different blocks. Such combined headers may enable faster random access of chunk data within a block. For example, loading all headers at substantially the same time may allow a receiving computing device to locate all chunks in a block (or blocks in a zone), rather than locating chunks incrementally.

In some embodiments, the computing device may split a 64-byte chunk across two 32-byte blocks, which is referred to herein as a bridging compression. In such embodiments, the computing device may encode information in the metadata that enables the identification of the start location(s) of chunks and/or blocks. In some embodiments, the computing device may include information in a header at the beginning of a block (e.g., a 32-byte block) to indicate the start location of chunk or block data in each zone, which enables data to bridge from the previous block. The computing device may add such information to every header or to some headers as required to locate chunk or block data.

In some embodiments, generating metadata describing the type of packing used for the chunk of image data may include generating metadata indicating a zone offset of a zone in which a block is grouped, and packing the chunk of image data according to the determined type of packing may include grouping the block into the zone. In some embodiments, generating metadata describing the type of packing used for the chunk of image data may include generating metadata indicating a zone size of a zone in which a block is grouped. In some embodiments, generating metadata describing the type of packing used for the chunk of image data may include generating metadata indicating a block offset of the one or more blocks in a zone. In some embodiments, generating metadata describing the type of packing used for the chunk of image data may include generating metadata indicating a number of blocks in a zone. In some embodiments, generating metadata describing the type of packing used for the chunk of image data may include generating metadata indicating a location of a header in a zone. In some embodiments, generating metadata describing the type of packing used for the chunk of image data may include generating metadata indicating that a block header includes an offset field.

In various embodiments, a receiving computing device (e.g., a second computing device) may receive from a sending computing device packed image data and metadata describing the type of packing used for the chunk of image data. In various embodiments, the receiving computing device may determine the type of packing used for the chunk of image data based on the decoded metadata, and may unpack the chunk of image data according to the determined type of packing used for the chunk of image data. In some embodiments, determining the type of packing used for a chunk of image data based on the decoded metadata may include identifying a block in which the chunk of image data is packed. In some embodiments, determining the type of packing used for a chunk of image data based on the decoded metadata may include identifying a zone including the block in which the chunk of image data is packed.

In some embodiments, the receiving computing device may decode the metadata to identify information indicating the type of packing used for the chunk of image data. In some embodiments, the receiving computing device may determine a zone offset (e.g., 32 bytes aligned) to determine the start of a zone that includes one or more blocks. In some embodiments, the receiving computing device may determine a zone size (e.g., 32 bytes or 64 bytes). In some embodiments, the receiving computing device may determine a block offset within a zone. In some embodiments, the receiving computing device may determine a number of blocks indicated in a zone header (which may, in some embodiments, be necessary for combined headers). In some embodiments, the receiving computing device may determine whether a header is inserted at a 32-byte location in a 64-byte zone (e.g., to indicate bridging compression). In some embodiments, the receiving computing device may determine whether a block header includes an offset field.

In some embodiments, a receiving computing device may use the metadata to determine a zone of memory to be loaded (e.g., one 64-byte block) or accessed (e.g., all blocks). In some embodiments, the receiving computing device may locate block information, and may send the block information to a decompressor module (e.g., of a compression/decompression algorithm) or to another suitable module of the receiving computing device for unpacking.

Various embodiments improve operations of computing devices by improving the packing efficiency of image data in a manner that facilitates the transmission, access and use of such data by processors and applications that access data linearly. Various embodiments enable a larger block of data (e.g., a 256-byte block) that includes smaller portions of data (e.g., 64B linear portions) to be compressed such that the smaller portions are individually accessible. In some embodiments, the metadata may be written and/or maintained in a relatively small size, for example, within 8 bits when the data includes 4 sub-portions. Various embodiments enable aligned 64-byte chunks (e.g., line chunks) to be read and decompressed from, for example, 32 byte or 64-byte blocks. In some embodiments, the metadata may be maintained at an 8-bit size.

Various embodiments provide improved data compression and improved accessibility of the compressed data. In some embodiments, a whole block may be compressed more than portions of the whole. For example, 8:1 compression may be achieved of a whole block, while compression of individually-accessed portions of the block may achieve up to 2:1 compression. Further, by enabling portions to be independently readable, readers may be enabled to read data using a different layout than a layout in which the block was written. For example, the reader may read the data at portion granularity rather than at the block level. While various embodiments are described in terms of tiling direction, this is not intended as a limitation on an amount of a layout remapping, which may be unlimited. In some embodiments, a layout that places portions together that compressed well together may improve achieved data compression even further. For example, a compression algorithm configured to share information between portions encoded into a final output block may further improve overall data compression.

Various embodiments may be useful in communicating image data over communication networks, including wireless communication networks by compressing data blocks prior to transmission. FIG. 1 is a system block diagram illustrating an example communication system 100 suitable for implementing any of the various embodiments. The communications system 100 may be a 5G New Radio (NR) network, or any other suitable network such as a Long Term Evolution (LTE) network.

The communications system 100 may include a heterogeneous network architecture that includes a core network 140 and a variety of wireless devices (illustrated as wireless devices 120a-120e in FIG. 1). The wireless devices 120a-120e are examples of computing devices. The communications system 100 may also include a number of base stations (illustrated as the BS 110a, the BS 110b, the BS 110c, and the BS 110d) and other network entities. A base station is an entity that communicates with wireless devices, and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a wireless device) and transmit the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using Time Division Duplexing (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. A wireless device 120a-120e may be included inside a housing that houses components of the wireless device, such as processor components, memory components, similar components, or a combination thereof.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

Figure 2:
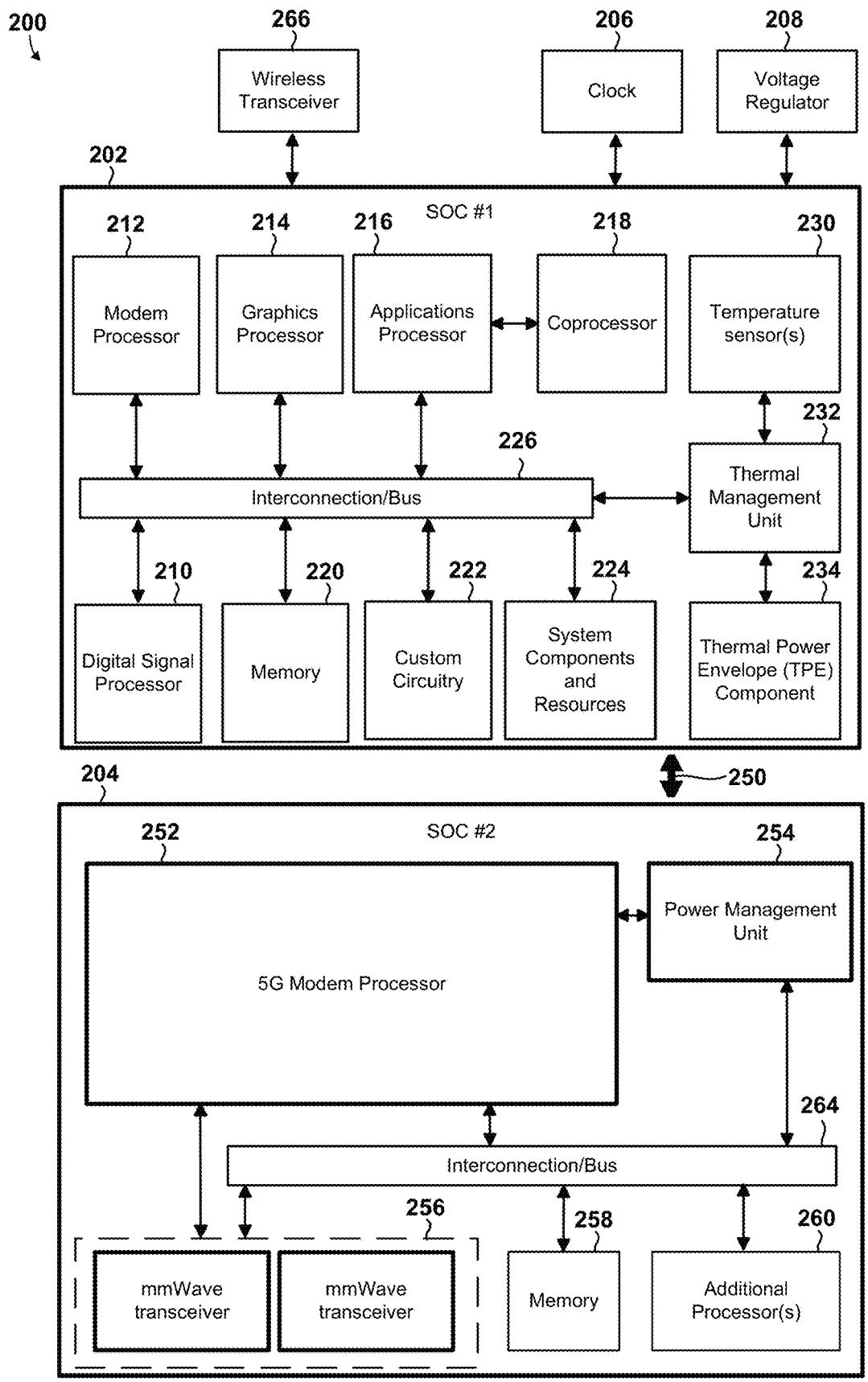
FIG. 2 is a component block diagram illustrating an example computing and wireless modem system suitable for implementing any of the various embodiments.

In some embodiments, two or more wireless devices 120a-120e (for example, illustrated as the wireless device 120a and the wireless device 120e) may communicate directly using one or more sidelink channels 124 (for example, without using a base station 110a-110d as an intermediary to communicate with one another). For example, the wireless devices 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes two SOCs 202, 204 coupled to a clock 206, a voltage regulator 208, and a wireless transceiver 266 configured to send and receive wireless communications via an antenna (not shown) to/from wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
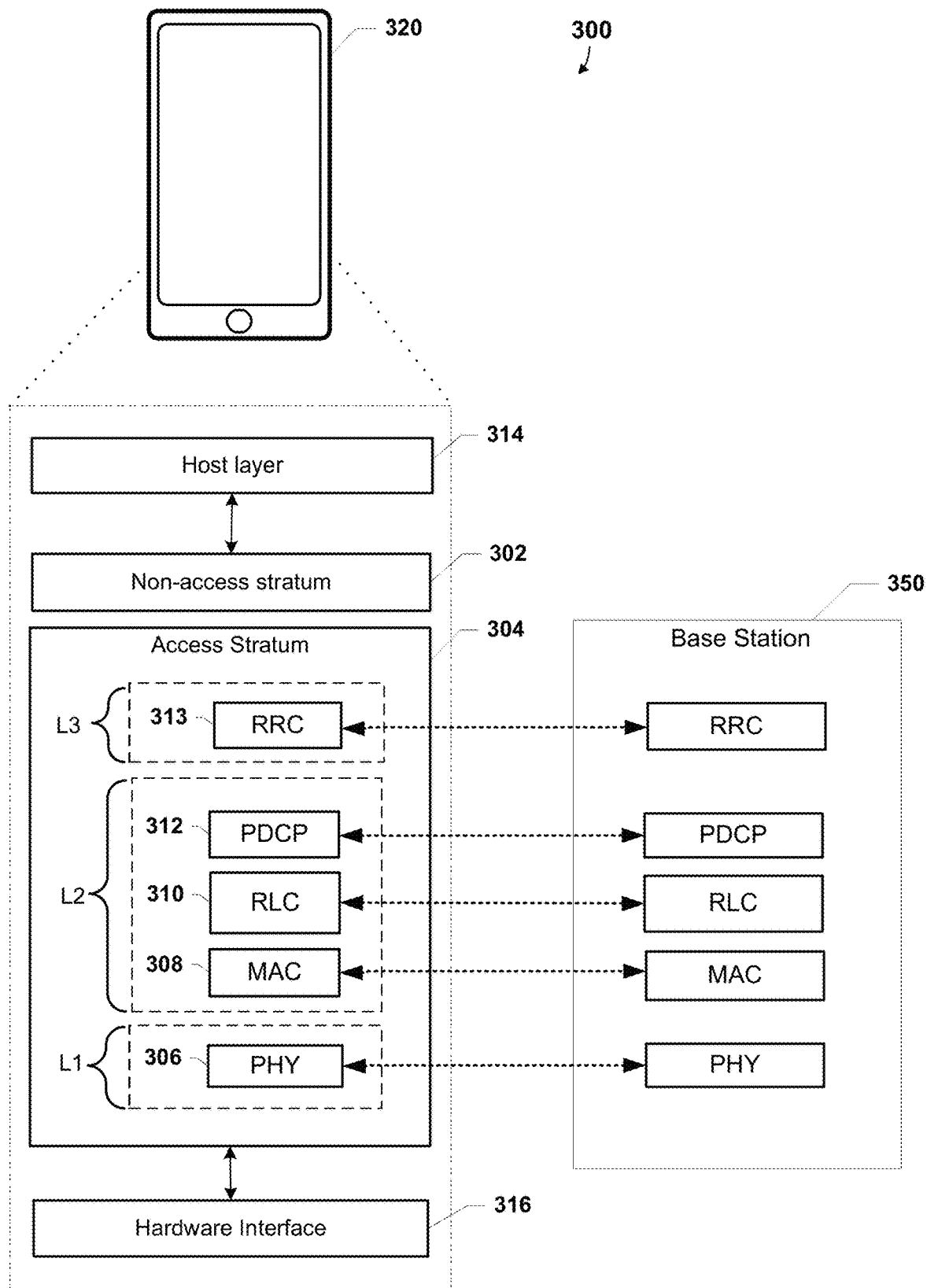
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different subscriber identity module (SIM) (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface via a wireless transceiver (e.g., 256). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4A:
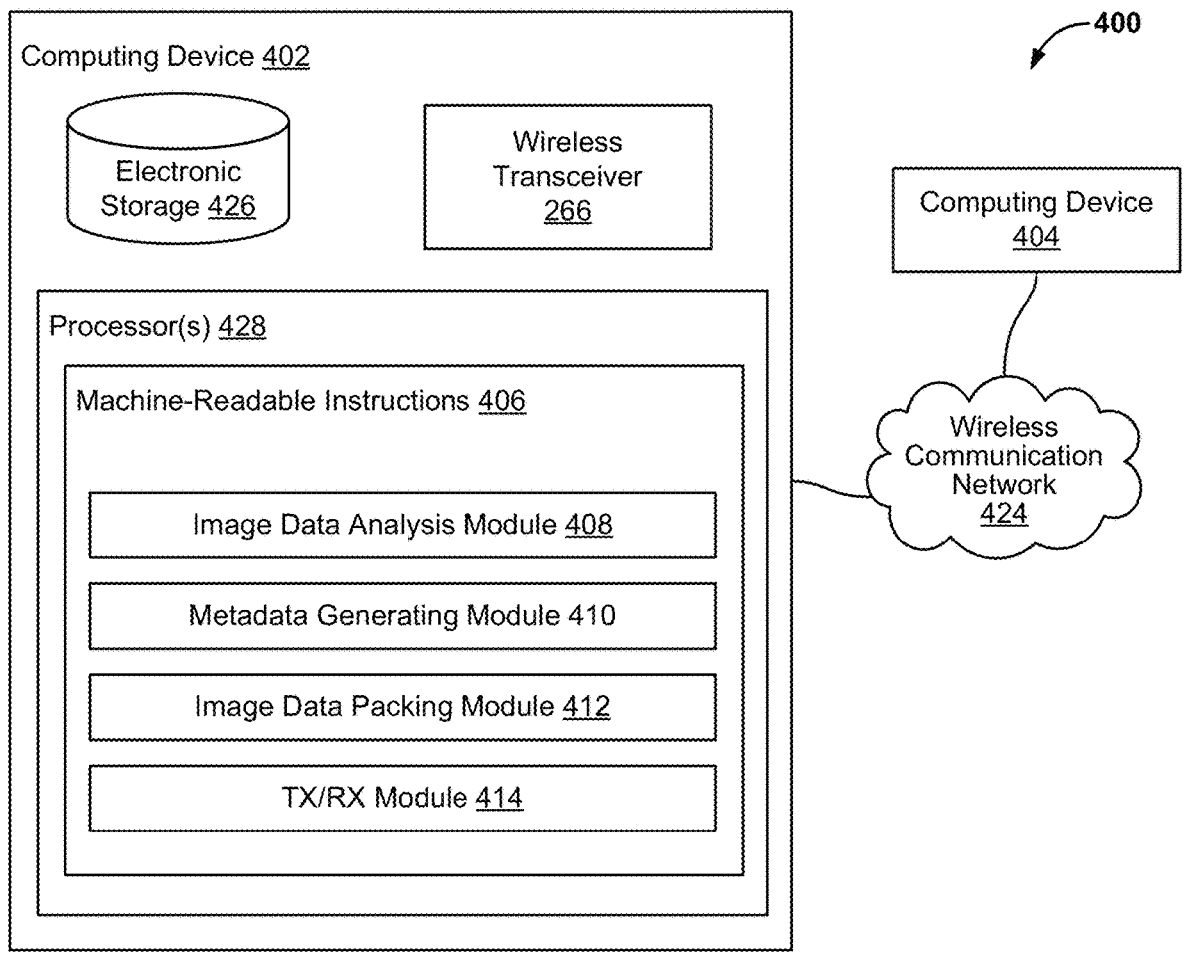
FIGS. 4A and 4B are component block diagrams illustrating a system configured for image compression and image decompression accordance with various embodiments.
Figure 4B:
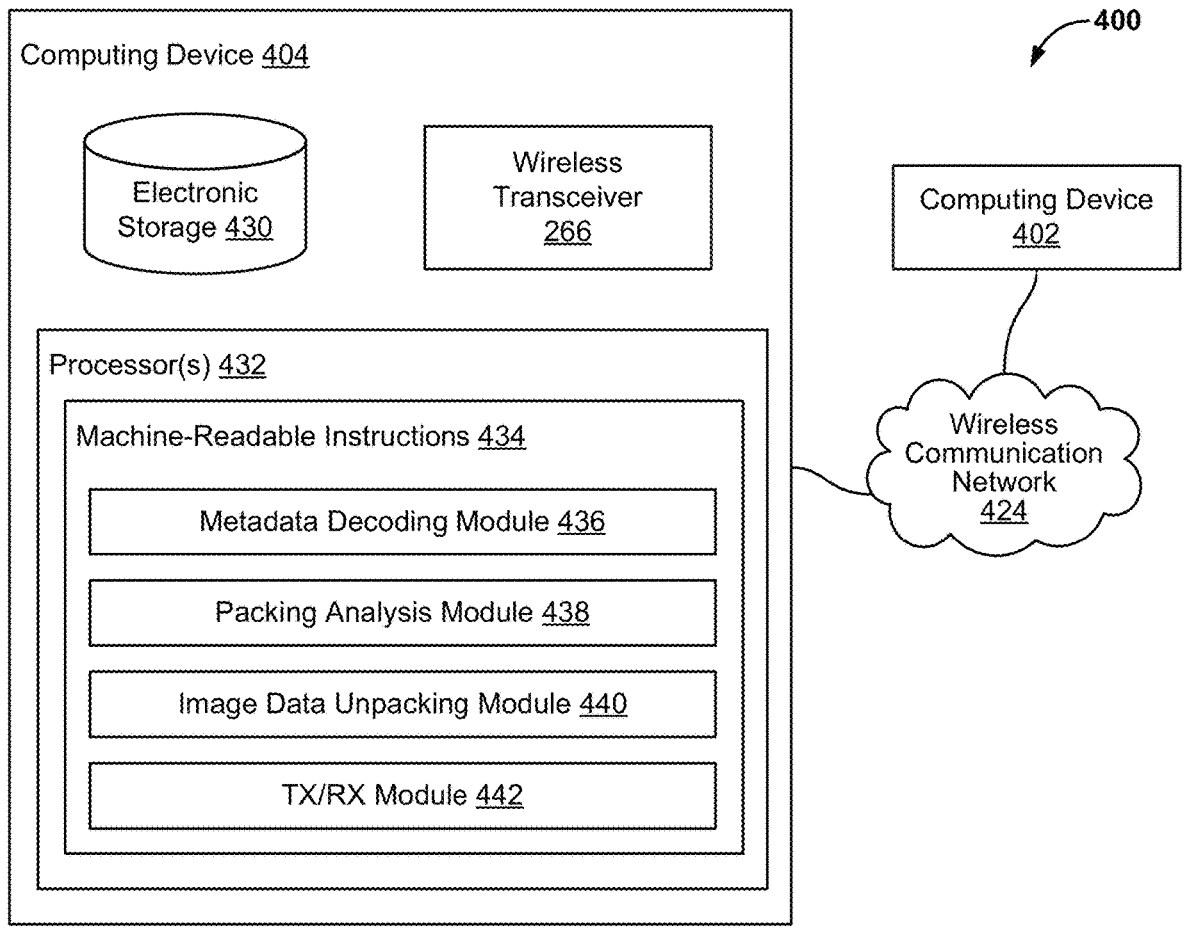

FIGS. 4A and 4B are component block diagrams illustrating a system 400 configured for image compression and image decompression accordance with various embodiments. With reference to FIGS. 1-4B, system 400 may include computing devices 402 and 404 (e.g., 110a-110d, 120a-120e, 200, 320, 350). In some embodiments, computing devices 402 and 404 may communicate over a wired or wireless communication link 122, 124, 126 (aspects of which are illustrated in FIG. 1).

The computing devices 402, 404 may include one or more processors 428 coupled to electronic storage 426, 430 and a wireless transceiver (e.g., 266). The wireless transceiver 266 may be configured to receive messages sent in downlink transmissions from the wireless communication network 424 and pass such message to the processor(s) 428, 432 for processing. Similarly, the processor(s) 428, 432 may be configured to send message for uplink transmission to the wireless transceiver 266 for transmission to the wireless communication network 424. In some embodiments, the computing device may be a sending computing device and the computing device 404 may be a receiving wireless device, e.g., of a compressed chunk of image data and related metadata.

Referring to the computing device 402, the processor(s) 428 may be configured by machine-readable instructions 406. Machine-readable instructions 406 may include one or more instruction modules. The instruction modules may include computer program modules. In some embodiments, the functions of the instruction modules may be implemented in software, firmware, hardware (e.g., circuitry), or a combination of software and hardware, which are configured to perform particular operations or functions. The instruction modules may include one or more of an image data analysis module 408, a metadata generating module 410, an image data packing module 412, a transmit/receive (TX/RX) module 414, or other instruction modules.

The image data analysis module 408 may be configured to determine a type of packing used for a chunk of image data. For example, the image data analysis module 408 may be configured to analyze a chunk of image data and determine its compressibility.

The metadata generating module 410 may be configured to generate metadata describing the type of packing used for the chunk of image data.

The image data packing module 412 may be configured to pack the chunk of image data according to the determined type of packing.

The transmit/receive (TX/RX) module 414 may be configured to send the packed chunk of image data and the metadata to a second computing device (e.g., the computing device 404).

Referring to the computing device 404, the processor(s) 432 may be configured by machine-readable instructions 434. Machine-readable instructions 406 may include one or more instruction modules. The instruction modules may include computer program modules. The instruction modules may include one or more of a metadata decoding module 436, a packing analysis module 438, an image unpacking module 440, a TX/RX module 442, or other instruction modules.

The metadata decoding module 436 may be configured to decode metadata describing a type of packing used for a chunk of image data.

The packing analysis module 438 may be configured to determine the type of packing used for the chunk of image data based on the decoded metadata.

The image unpacking module 440 may be configured to unpack the chunk of image data according to the determined type of packing used for the chunk of image data.

The TX/RX module 442 may be configured to enable communications with the wireless communication network 424.

In some embodiments, the computing devices 402, 404 may be operatively linked via one or more electronic communication links (e.g., wireless communication link 122). It will be appreciated that this is not intended to be limiting, and that the scope of this disclosure includes embodiments in which the computing devices 402, 404 may be operatively linked via some other communication medium.

The electronic storage 426, 430 may include non-transitory storage media that electronically stores information. The electronic storage media of electronic storage 426, 430 may include one or both of system storage that is provided integrally (i.e., substantially non-removable) with the computing devices 402, 404 and/or removable storage that is removably connectable to the computing devices 402, 404 via, for example, a port (e.g., a universal serial bus (USB) port, a firewire port, etc.) or a drive (e.g., a disk drive, etc.). Electronic storage 426, 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426, 430 may include one or more virtual storage resources (e.g., cloud storage, a virtual private network, and/or other virtual storage resources). Electronic storage 426, 430 may store software algorithms, information determined by processor(s) 428, 432, information received from the computing devices 402, 404, or other information that enables the computing devices 402, 404 to function as described herein.

Processor(s) 428, 432 may be configured to provide information processing capabilities in the computing devices 402, 404. As such, the processor(s) 428, 432 may include one or more of a digital processor, an analog processor, a digital circuit designed to process information, an analog circuit designed to process information, a state machine, and/or other mechanisms for electronically processing information. Although the processor(s) 428, 432 are illustrated as single entities, this is for illustrative purposes only. In some embodiments, the processor(s) 428, 432 may include a plurality of processing units and/or processor cores. The processing units may be physically located within the same device, or processor(s) 428, 432 may represent processing functionality of a plurality of devices operating in coordination. The processor(s) 428, 432 may be configured to execute modules 408-414 and modules 436-442 and/or other modules by software; hardware; firmware; some combination of software, hardware, and/or firmware; and/or other mechanisms for configuring processing capabilities on processor(s) 428, 432. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-414 and modules 436-442 described below is for illustrative purposes, and is not intended to be limiting, as any of modules 408-414 and modules 436-442 may provide more or less functionality than is described. For example, one or more of the modules 408-414 and modules 436-442 may be eliminated, and some or all of its functionality may be provided by other modules 408-414 and modules 436-442. As another example, the processor(s) 428, 432 may be configured to execute one or more additional modules that may perform some or all of the functionality attributed below to one of the modules 408-414 and modules 436-442.

Figure 5A:
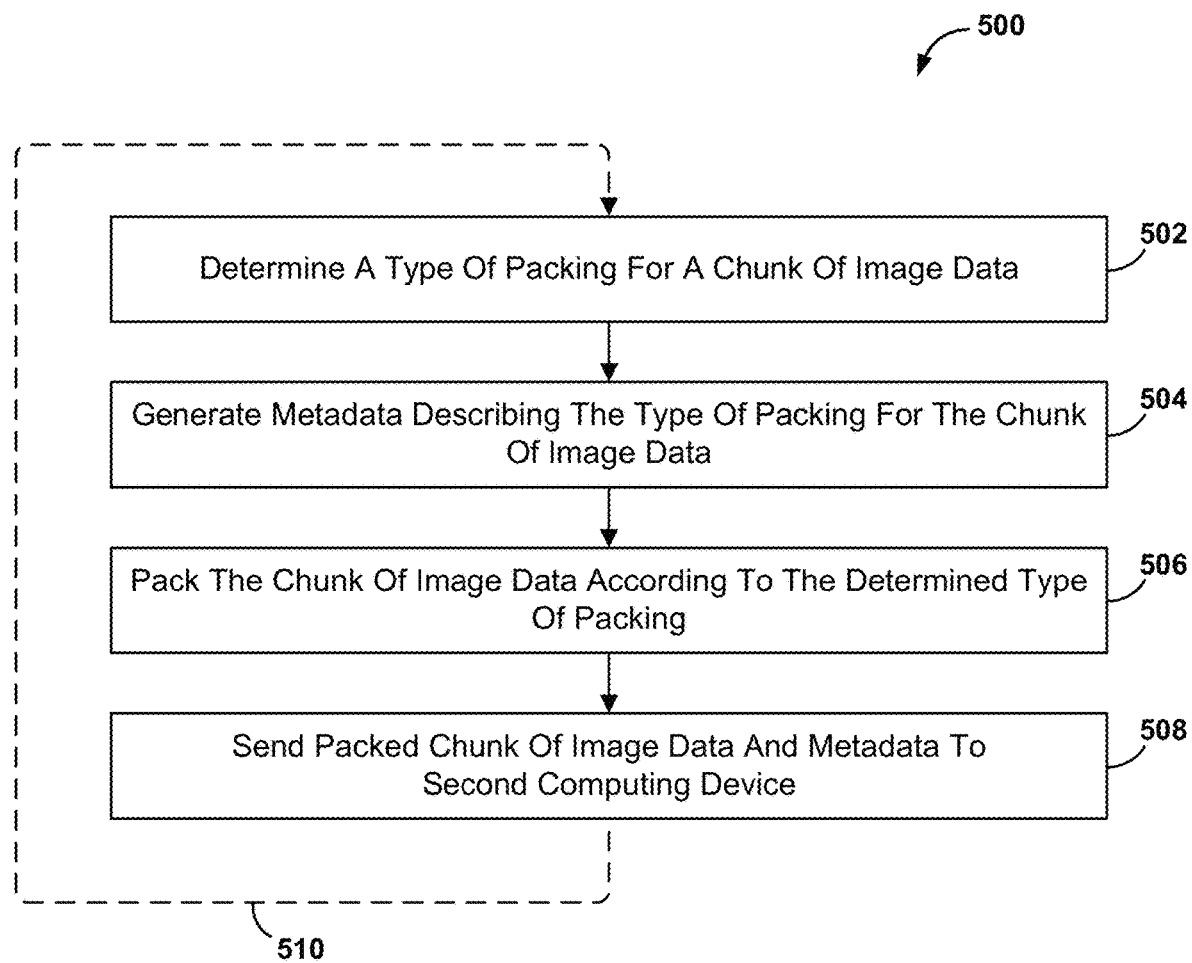
FIG. 5A is a process flow diagram illustrating a method that may be performed by a processor of a computing device for image compression in accordance with various embodiments.

FIG. 5A is a process flow diagram illustrating a method 500 that may be performed by a processor of a computing device for image compression according to various embodiments. With reference to FIGS. 1-5A, the method 500 may be implemented by a processor (e.g., 210, 212, 214, 216, 218, 252, 260, 428, 432) of a computing device (e.g., the wireless devices 120*a*-120*e*, 200, 320, 402, 404).

In block 502, the processor may determine a type of data compression or packing to use for a chunk of image data. In some embodiments, the processor may analyze the chunk of image data to determine its compressibility, and determine a type of packing suitable for the chunk of image data based on its compressibility. Means for performing functions of the operations in block 502 may include the processor (e.g., 210, 212, 214, 216, 218, 252, 260, 428, 432).

In block 504, the processor may generate metadata describing the packing that will be applied to the chunk of image data. The metadata may include information indicating the location of one or more blocks and/or the location of chunk data in or across one or more blocks. In some embodiments, the metadata describing the type of packing used for the chunk of image data may enable the chunk of image data to be read independently of a second chunk of image data. In some embodiments, the metadata describing the type of packing used for the chunk of image data may enable the chunk of image data to be written tiled and read linearly. In some embodiments, generating the metadata describing the type of packing used for the chunk of image data may include generating metadata indicating whether the chunk of image data is compressed or uncompressed. Means for performing functions of the operations in block 504 may include the processor (e.g., 210, 212, 214, 216, 218, 252, 260, 428, 432).

In block 506, the processor may pack the chunk of image data according to the determined type of packing. In some embodiments, packing the chunk of image data may include packing two or more chunks of image data according to the determined type of packing. Means for performing functions of the operations in block 506 may include the processor (e.g., 210, 212, 214, 216, 218, 252, 260, 428, 432).

In block 508, the processor may send the packed chunk of image data and the metadata to a second computing device. In some embodiments, the processor may send the packed two or more chunks of image data and the metadata to the second computing device. Means for performing functions of the operations in block 508 may include the processor (e.g., 210, 212, 214, 216, 218, 252, 260, 428, 432) and a wireless transceiver (e.g., 266).

In operation 510, the processor may repeat the operations of blocks 502-508 to process multiple chunks of image data.

Figure 5B:
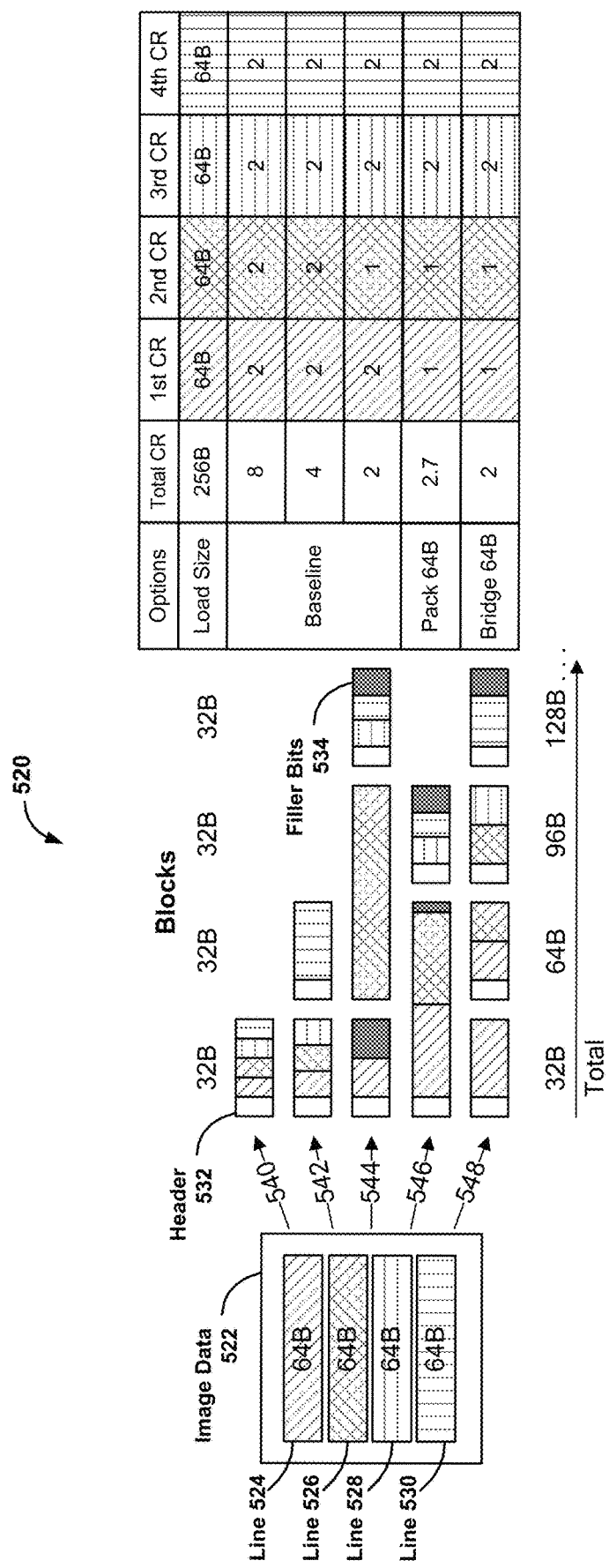
FIG. 5B is conceptual block diagram illustrating examples of image data compression schema in accordance with various embodiments.

FIG. 5B is conceptual block diagram illustrating image data compression schema 520 in accordance with various embodiments. With reference to FIGS. 1-5B, the image data compression schema 520 may be implemented by a processor (e.g., 210, 212, 214, 216, 218, 252, 260, 428, 432) of a computing device (e.g., the wireless devices 120*a*-120*e*, 200, 320, 402, 404).

Image data 522 may include lines 524, 526, 528, and 530. Each of lines 524-530 may include 64 bytes of data. In some embodiments, the processor may compress each of lines 524, 526, 528, and 530 individually and may store each compressed line in a 32-byte block or a 64-byte block aligned to 32 bytes.

The processor may compress the image data according to one or more examples 520 of image data compression. As illustrated in example 540, the processor may compress the four lines 524-530 into a 32-byte block. As illustrated in examples 542 and 548, the processor may compress one line (e.g., line 530 in example 542 and line 524 in example 548) into a 32-byte block. As illustrated in example 544, the processor may bridge one line (e.g., line 526) across two 32-byte blocks. As illustrated in examples 544, 546, and 548, the processor may compress two lines into one 32-byte block. As illustrated in example 546, the processor may bridge a line from one 32-byte block to another 32-byte block (i.e., two lines in 64 bytes, or "Pack 64B"). As illustrated in example 548, the processor may extend one line across two 32-byte blocks ("Bridge 64B"). In various embodiments, the processor may include a header 532 at the beginning of at least one block as further described below. In some embodiments, the processor may add filler bits 534 to fill out a 32-byte block. The accompanying table illustrates a compression ratio (CR) that may be achieved for each line 524-530.

Figure 5C:
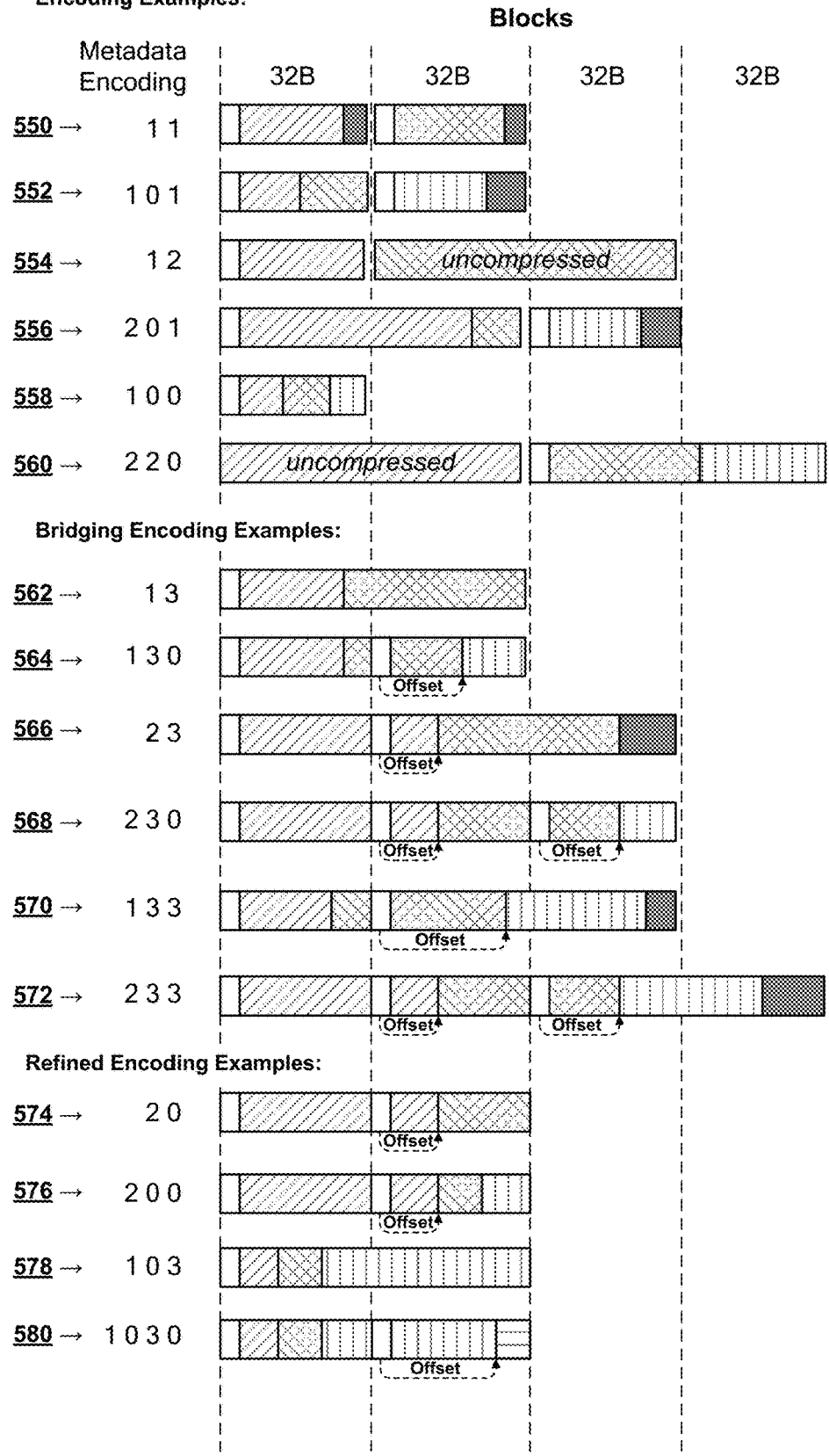
FIG. 5C is a conceptual block diagram illustrating examples of metadata encodings in accordance with various embodiments.

FIG. 5C is conceptual block diagram illustrating metadata encodings 585, in accordance with various embodiments. With reference to FIGS. 1-5C, the metadata encodings 585 may be implemented by a processor (e.g., 210, 212, 214, 216, 218, 252, 260, 428, 432) of a computing device (e.g., the wireless devices 120*a*-120*e*, 200, 320, 402, 404).

To enable random access to image data, the location and size of each 64-byte chunk may be described in the metadata. In some embodiments, each 64-byte chunk may be read from a 32-byte block or two 32-byte blocks totaling 64 bytes (sometimes referred to as a 64-byte block). In some embodiments, the processor may prioritize compressing a chunk into a 32-byte block, which may improve efficiency and performance of compression and decompression operations. In some embodiments, if more than one 64-byte chunk is compressed into the same block, compression headers must be provided for each chunk. In some embodiments, a 64-byte chunk when compressed may fit in a previous block (which may be signified by "0"), begin a 32-byte compressed block (which may be signified by "1"), or begin a 64-byte compressed block (which may be signified by "2").

In some embodiments, a metadata encoding scheme may include two states for an initial chunk (encoded by 1 bit) and three states for additional chunks (encoded by more than 1 bit and less than or equal to 2 bits). For example, for four chunks, metadata may encode for 54 states (i.e., 2*3*3*3 states) that may be encoded in 6 bits (or in 7 bits if kept separate, i.e., 1+2+2+2 bits). In various embodiments, the metadata encoding scheme may be generalized to more or fewer chunks.

In some embodiments, the first 64-byte chunk may start at the beginning of a block, and cannot be compressed to correspond with a value "0". In some embodiments, two lines may share a 64-byte block if compression is insufficient to overcome line overheads caused by their separation into two 32-byte blocks. In such embodiments, a "0" metadata encoding may not follow a "2" metadata encoding, resulting in 34 possible states. In some embodiments, bridging options may be indicated by a "3" metadata encoding (i.e., a "3" value may indicate that chuck is bridged, or continues, from a previous block). In some embodiments, bridging options may be fully described using 7 bits. In some embodiments, the metadata encoding scheme may be generalized to encode higher order states, such as overlapping more than two tiles.

Metadata encodings 550-580 illustrate non-limiting examples of such information encoded in the metadata. Metadata encoding 550 "1 1" signifies that two chunks each start at the beginning of a 32-byte block. Metadata encoding 552 "1 0 1" signifies the start of a 32-byte compressed block, followed by a 64-byte chunk fit into the 32-byte block, followed by the start of another 32-byte compressed block. Metadata encoding 554 "1 2" signifies the start of a 32-byte compressed block, followed by the start of a 64-byte block, in this example, of uncompressed image data. Metadata encoding 556 "2 0 1" signifies the start of a 64-byte compressed block, followed by a 64-byte chunk that fits into the second 32-byte block, followed by a 32-byte compressed block. Metadata encoding 558 "1 0 0" signifies the start of a 32-byte compressed block, followed by a 64-byte chunk that fits into the same 32-byte block, followed by a second 64-byte chunk that fits into the same 32-byte block. Metadata encoding 560 represents a special case, in which "2 2 0" signifies the start of a 64-byte uncompressed block, followed by the start of a 64-byte uncompressed block, followed by a 64-byte chunk is fit into the second 64-byte block. In metadata encoding 560, the first "2" value is not followed by an indication that it shares a block with another chunk, and in some embodiments, this may signify the presence of uncompressed image data.

In some embodiments, the processor may split a 64-byte chunk across two 32-byte blocks (i.e., "bridging" or "overlap" between or across two 32-byte blocks). For example, if a line of data (e.g., the lines 524-530) requires greater than 32 bytes when compressed (e.g., 64 bytes), the processor may compress a first part of the line in a 32-byte block and the remainder of the line in a subsequent 32-byte block. Further, in some embodiments, overlaps or bridging of chunks across blocks may continue serially, such that a first line may be packed into a first 32 byte block and a portion of a second 32 byte block; a second line may be packed into the remainder of the second 32 byte block and a portion of a third 32 byte block, and so forth. Various embodiments may be implemented to prioritize 64-byte compression and/or 256-byte compression, which the processor may perform dynamically or statically according to the implementation. To save space, the processor may omit a header where a 32B compression could otherwise be separately decoded. In some embodiments, the processor may dynamically determine to compress a chunk within 32 bytes, or to bridge the chunk over two 32-byte blocks each with another compressed block that may fit within the remainder of each 32-byte block. In some embodiments, the processor may be configured to dynamically determine chunk compression in this manner universally for an implementation, for example favoring full compression access over individually accessed compression. In some embodiments, the processor may be configured to dynamically determine chunk compression based on a buffer size (i.e., buffer capacity) or buffer utilization (i.e., an amount of data stored in a buffer), or for a particular use case. In some embodiments, the processor may be configured to dynamically determine chunk compression to meet a compressibility target. For example, the processor may be configured to enable to ensure a certain balance in compressibility, such as a minimum compressibility for full tiles.

Metadata encodings 562-572 illustrate non-limiting examples of metadata signifying bridging, and metadata encodings 574-580 illustrate non-limiting examples of more complex ("refined") metadata encodings. Metadata encoding 562 "1 3" signifies the start of a 32-byte compressed block, followed by a chunk extends from one 32-byte block to the next 32-byte block.

Metadata encoding 564 illustrates a more complex bridging in which metadata "1 3 0" signifies the start of a 32-byte compressed block, followed by a chunk that extends to the following 32-byte block, followed by a chunk that fits into the second 32-byte block. The example metadata encoding 564 also includes a second header at the beginning of the second 32-byte block, which includes offset information indicating the beginning of the third chunk. Such block offset information may enable a receiving computing device to locate the beginning of the third chunk. Examples of such offset information are also illustrated in examples 566, 568, 570, 572, 574, 576, and 580. In some embodiments, the second header may include additional header information for a chosen compression scheme. In some embodiments, the processor may employ different compression schemes for different chunks.

Metadata encoding 566 "2 3" signifies the start of a 64-byte compressed block, followed by a chunk that extends from a previous block. Metadata encoding 568 "2 3 0" signifies the start of a 64-byte compressed block, followed by a chunk that extends from a previous block, followed by a chunk that fits within the last 32-byte block. Metadata encoding 570 "1 3 3" signifies the start of a 32-byte compressed block, followed by a chunk that extends from a previous block, followed by a second chunk that extends from a previous block. Metadata encoding 572 "2 3 3" signifies the start of a 64-byte compressed block, followed by a chunk that extends from a previous block, followed by a second chunk that extends from a previous block.

Metadata encoding 574 "2 0" signifies the start of a 64-byte compressed block, followed by a 64-byte chunk that fits into the remainder of the second 32-byte block. Metadata encoding 576 "2 0" signifies the start of a 64-byte compressed block, followed by a 64-byte chunk that fits into the remainder of the second 32-byte block, followed by a second 64-byte chunk that also fits into the remainder of the second 32-byte block. Metadata encoding 578 "1 0 3" signifies the start of a 32-byte compressed block, followed by a 64-byte chunk that fits into the remainder of the second 32-byte block, followed by a chunk that extends from the previous 32-byte block. Metadata encoding 578 "1 0 3 0" signifies the start of a 32 byte compressed block, followed by a 64 byte chunk that fits into the remainder of the 32 byte block, followed by a chunk that extends from the previous 32 byte block, followed by a 64 byte chunk that fits into the remainder of the second 32 byte block. The example illustrated in FIG. 5C are not exhaustive and other forms of metadata encoding are possible in various embodiments.

Figure 5D:
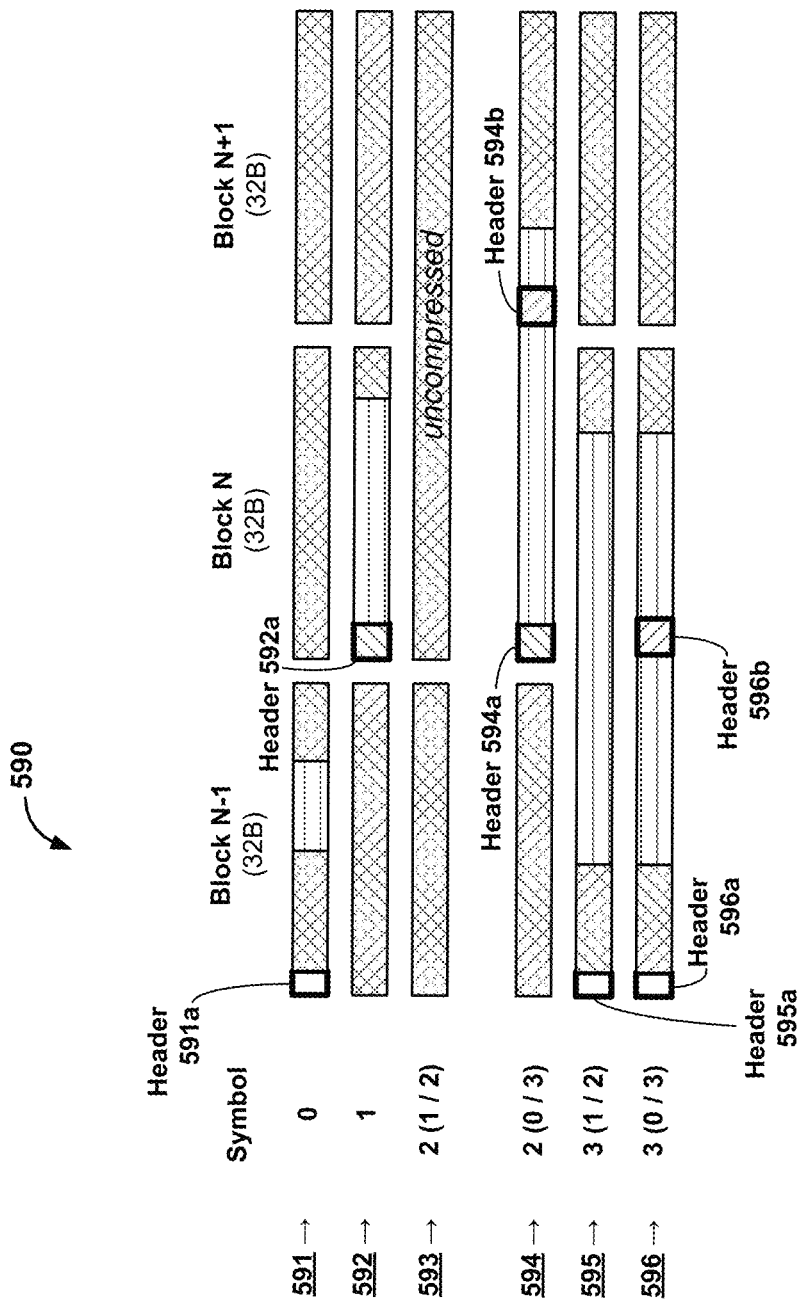
FIG. 5D is a conceptual block diagram illustrating examples of metadata encodings in accordance with various embodiments.

FIG. 5D is conceptual block diagram illustrating metadata encodings 590 in accordance with various embodiments. With reference to FIGS. 1-5D, the metadata encodings 590 may be implemented by a processor (e.g., 210, 212, 214, 216, 218, 252, 260, 428, 432) of a computing device (e.g., the wireless devices 120*a*-120*e*, 200, 320, 402, 404).

The metadata may include information describing the type of packing used for the chunk of image data into three blocks, N−1, N, and N+1. Block N−1 may correspond to a last block in which a previous chunk is placed, and block N may correspond to a next unused block. In some embodiments, packing (e.g., positions of chunks) may be constructed progressively from a first chunk to a last chunk. In some embodiments, packing may be constructed progressively. In some embodiments, packing may be calculated in parallel. In some embodiments, packing may be constructed progressively. In some embodiments, packing may be precomputed and looked up in parallel.

In some embodiments, the information may be encoded in the metadata using a single bit, or a combination of bits or bit values, or any other suitable encoding of the information. In some embodiments, symbols concatenate together to form a full encoding. In some embodiments, for each symbol, block N may be the next unfilled block. For example, metadata encoding 591 "0" may signify that a 64-byte chunk is fit into a block, such as into block N−1. Metadata encoding 592 "1" (e.g., in header 592*a*) may signify the start of a new chunk in a 32-byte compressed block. Metadata encoding 593 "2" followed by a "1" or a "2" encoded chunk (illustrated as "½") may signify an uncompressed 64-byte chunk in 64 bytes. In such embodiments, the end of the tile may consider the "next symbol" to be 1 or 2. As another example, metadata encoding 594 "2" followed by a "0" or a "3" encoded chunk (illustrated as "0/3") (e.g., in a new header 594*a*) may signify the start of a new compressed chunk in 64 bytes. In some embodiments, a new header (e.g., 592*a*, 594*a*) may reflect a type of compression, and may encode necessary information for beginning a new compressed block, and encoding information governing a new chunk. For example, the header 592*a*, 594*a* may signify a start header. Metadata encoding 595 "3" followed by a "1" or "2" encoded chunk may signify a bridging chunk packed into a previous block (such as block N−1) and/or that a chunk extends (or overlaps) from a previous block. Metadata encoding 596 "3" followed by "0" or "3" encoded chunk also may signify a bridging chunk packed into a previous block (such as block N−1).

A header 591*a*, 595*a*, 596*a* may indicate that a new chunk is governed by a previous header (i.e., information about the chunk may be found in an earlier header). For example, the header may encode information about the next chunk (in addition to previous chunks) or may encode an offset indicating a location where more information for that chunk is located, or any combination thereof. In some embodiments, an optional header 594*b*, 596*b* may be inserted following a "0" chunk. In some embodiments, the header 594*b*, 596*b* may include a header inserted at the start of a block but interrupting the compressed information of an encoded chunk that spans from a previous block to a block in which the header 594*b*, 596*b* is inserted. The header 594*b*, 596*b*, may be optional when there is no following chunk. In some embodiments, if there is any number of following "0" blocks not followed by a "3" block then these headers may also be omitted. In that case decoding of these "0" blocks can only occur when the two blocks are available rather than just one. In some embodiments, the presence of the optional header 594*b*, 596*b* may indicate that each block may be read and decoded separately. Without the optional header 594*b*, 596*b*, the following "0" block may require reading both blocks to decode. In some embodiments, for a "3" chunk, the optional header 594*b*, 596*b* may be omitted if there is no following chunk (e.g., the chunk is the last chunk in a tile).

Figure 6:
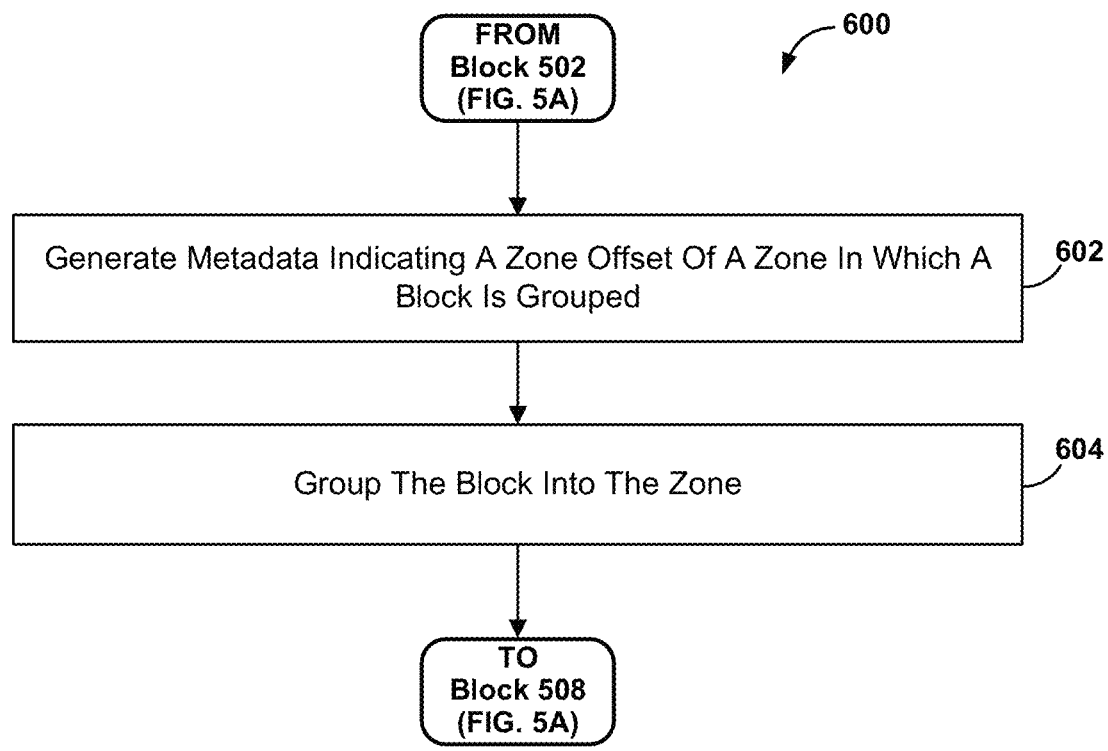
FIG. 6 is a process flow diagram illustrating operations that may be performed by a processor of a computing device as part of the method for image compression according to various embodiments.

FIG. 6 is a process flow diagram illustrating operations 600 that may be performed by a processor of a computing device as part of the method 500 for image compression according to various embodiments. With reference to FIGS. 1-6, the operations 600 and the method 500 may be implemented by a processor (e.g., 210, 212, 214, 216, 218, 252, 260, 428, 432) of a computing device (e.g., the wireless devices 120*a*-120*e*, 200, 320, 402, 404).

Following the performance of the operations of block 502 of the method 500, in block 602, the processor may generate metadata indicating a zone offset of a zone in which a block is grouped. In some embodiments, the processor may generate metadata indicating a zone size of a zone in which a block is grouped. In some embodiments, the processor may generate metadata indicating a block offset of the one or more blocks in a zone. In some embodiments, the processor may generate metadata indicating a number of blocks in a zone. In some embodiments, the processor may generate metadata indicating a location of a header in a zone. In some embodiments, the processor may generate metadata indicating that a block header includes an offset field. Means for performing functions of the operations in block 602 may include the processor (e.g., 210, 212, 214, 216, 218, 252, 260, 428, 432).

In block 604, the processor may pack the chunk of image data according to the determined type of packing by grouping the block into the zone. Means for performing functions of the operations in block 604 may include the processor (e.g., 210, 212, 214, 216, 218, 252, 260, 428, 432).

The processor may perform the operations of block 508 of the method 500 as described.

Figure 7A:
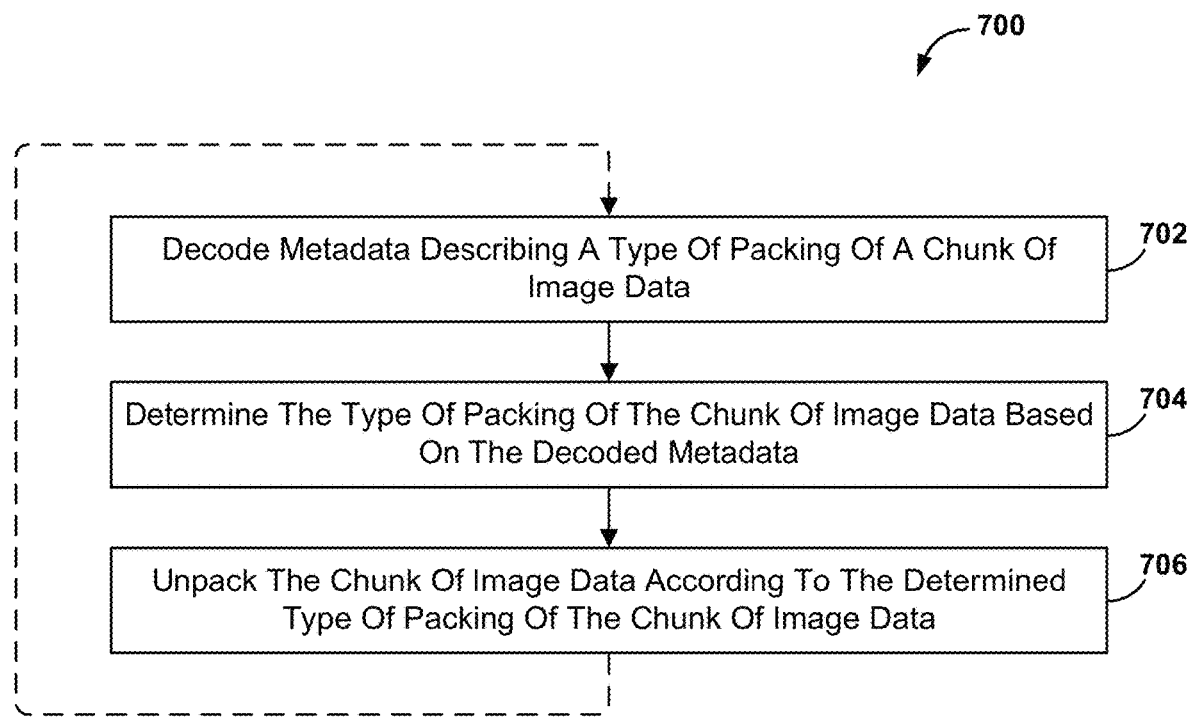
FIG. 7A is a process flow diagram illustrating a method that may be performed by a processor of a computing device for image decompression in accordance with various embodiments.

FIG. 7A is a process flow diagram illustrating a method 700 that may be performed by a processor of a computing device for image decompression according to various embodiments. With reference to FIGS. 1-7A, the method 700 may be implemented by a processor (e.g., 210, 212, 214, 216, 218, 252, 260, 428, 432) of a computing device (e.g., the wireless devices 120*a*-120*e*, 200, 320, 402, 404).

In block 702, the processor may decode metadata describing the type of packing used for a chunk of image data. Means for performing functions of the operations in block 702 may include the processor (e.g., 210, 212, 214, 216, 218, 252, 260, 428, 432).

In block 704, the processor may determine the type of packing used for the chunk of image data based on the decoded metadata. In some embodiments, the processor may identify a block in which the chunk of image data is packed. In some embodiments, the processor may identify a zone including the block in which the chunk of image data is packed. In some embodiments, the processor may identify a zone offset or zone size. In some embodiments, the processor may identify a block offset of the block in the zone. In some embodiments, the processor may identify a number of blocks in the zone. In some embodiments, the processor may identify a location of a block header in the zone. In some embodiments, the processor may identify that a block header includes an offset field. Means for performing functions of the operations in block 704 may include the processor (e.g., 210, 212, 214, 216, 218, 252, 260, 428, 432).

In block 706, the processor may unpack the chunk of image data according to the determined type of packing used for the chunk of image data. In some embodiments, the processor may read the chunk of image data independently of a second chunk of image data. In some embodiments, the processor may read the chunk of image data linearly where the chunk of image data was written tiled. Means for performing functions of the operations in block 706 may include the processor (e.g., 210, 212, 214, 216, 218, 252, 260, 428, 432).

The processor may repeat the operations of blocks 702-706 to process multiple chunks of image data.

Figure 7B:
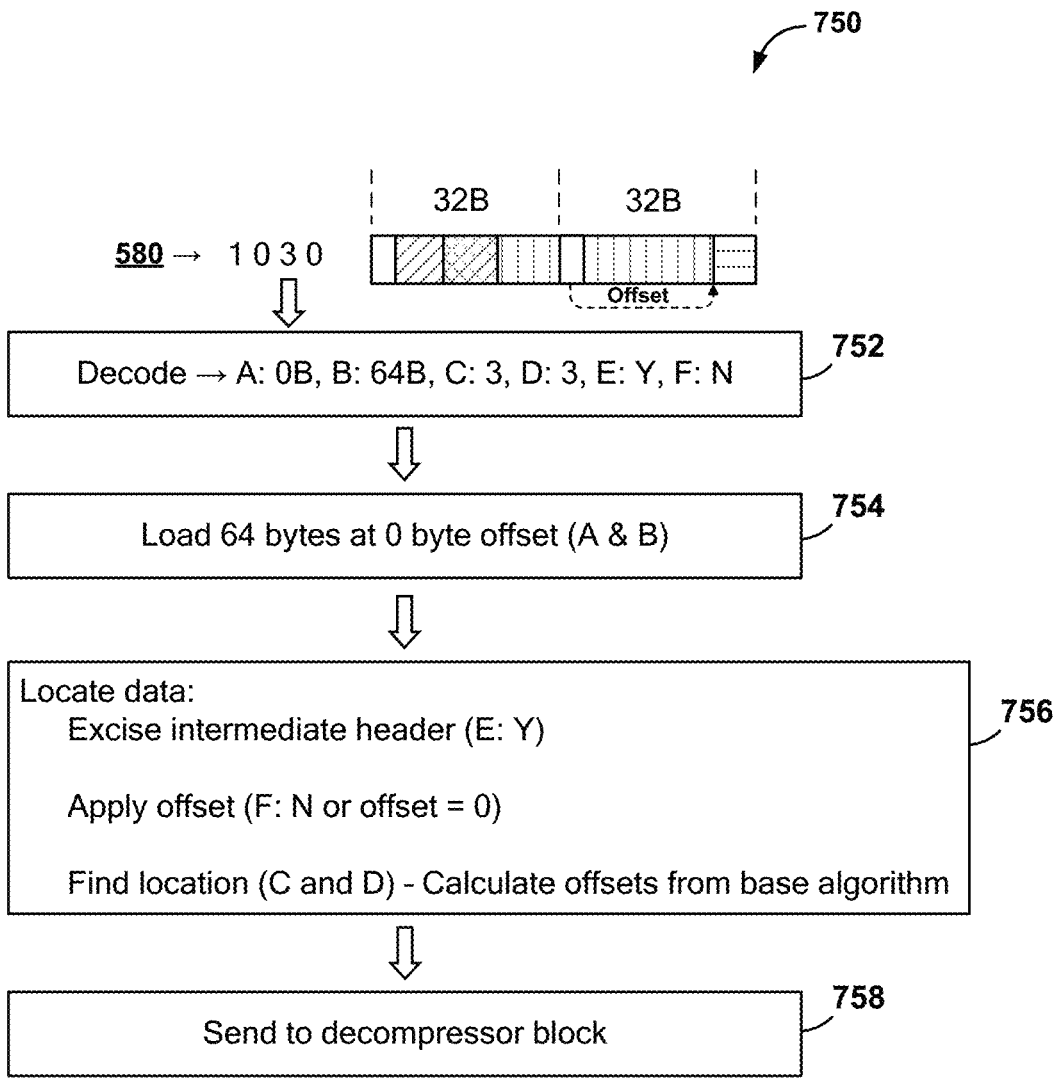
FIG. 7B is a conceptual block diagram illustrating an example of image decompression operations in accordance with various embodiments.

FIG. 7B is a conceptual block diagram illustrating an example of image decompression operations 750 in accordance with various embodiments. With reference to FIGS. 1-7B, the operations 750 may be implemented by a processor (e.g., 210, 212, 214, 216, 218, 252, 260, 428, 432) of a computing device (e.g., the wireless devices 120a-120e, 200, 320, 402, 404).

In various embodiments, a receiving computing device may receive a compressed chunk of image data and associated metadata (e.g., 580).

In operation 752, the processor of the receiving computing device may decode the metadata describing the type of packing used for the chunk of image data. In some embodiments, the metadata may be included in the compressed tile. For example, the processor may determine from the metadata a zone offset (e.g., field A: 0 bytes), a zone size (e.g., field B: 64 bytes), a block offset in the zone (e.g., field C: 3), a number of blocks in the zone header (e.g., field D: 3), whether there is a header inserted at the 32 byte mark in a 64 byte zone (e.g., field E: (Y)es or (N)o), and whether the header for this block includes an offset field (e.g., field F: (Y)es or (N)o). In some embodiments, block offset in the zone (e.g., field C) and the number of blocks in the zone header (e.g., field D) may be encoded or placed into the compressed tile. In some embodiments, the presence of an offset (e.g., field F: Y) may indicate that a first chunk in a block (i.e., a chunk not overhanging or continuing from a previous block) begins at an offset (to account for the overhang or continuation). In this example, the third chunk is a block that overhangs, and a previous chunk does not overhang, so field F may indicate No for the third chunk, and field F may indicate Yes for a fourth chunk.

In operation 754, the processor may load an indicated zone. For example, fields A and B may indicate which zone of memory to load (e.g., one 64B block) or to access (e.g., all blocks).

In operation 756, the processor may locate block information in the zone. In some embodiments, such block information may include the block offset in the zone (e.g., field C) and the number of blocks in the zone header (e.g., field D), and may be encoded or placed into the compressed tile. For example, fields C and D may indicate a location for data of the indicated block in the zone. In some embodiments, a total number allows for header data to be packed at the start of the zone. In some embodiments, fields E and F may indicate bridging of one or more chunks. In some embodiments, an offset value may be determined based on a value in the header and/or intermediate header.

Figure 8:
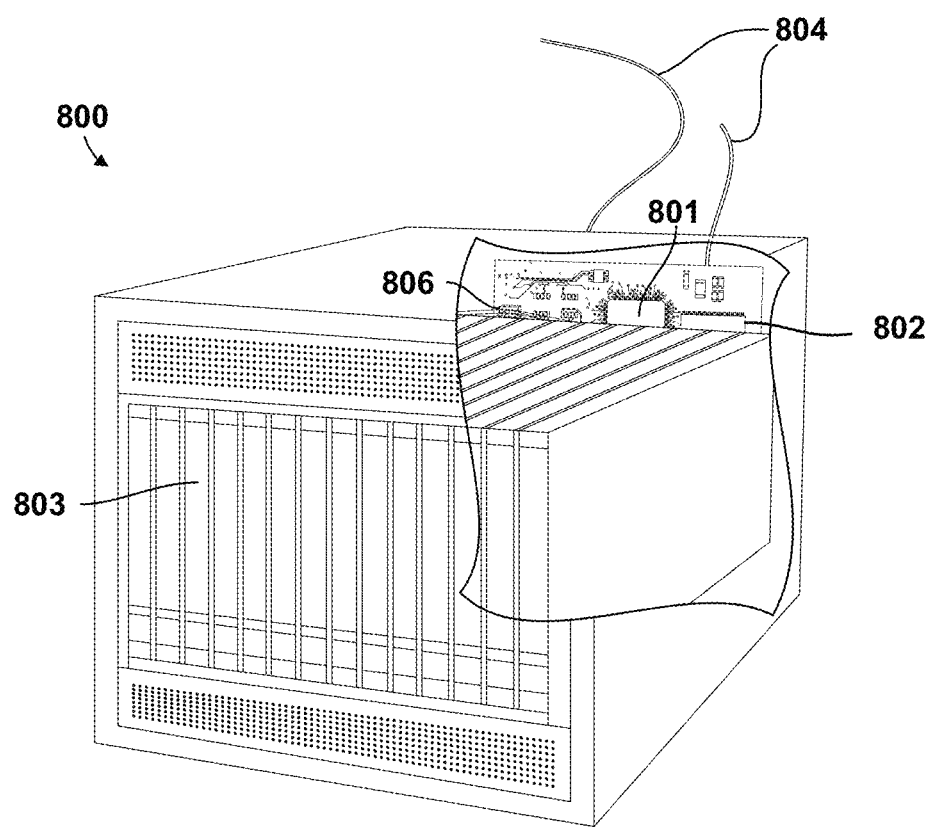
FIG. 8 is a component block diagram of a network computing device suitable for use with various embodiments.

In operation 758, the processor may send image data and the related metadata to a decompressor block (or to any suitable function of the computing device) for unpacking according to the determined type of packing used for the chunk of image data Various embodiments, including the methods and operations 500, 520, 585, 600, 700, and 750, may be performed in a variety of network computing device, an example of which is illustrated in FIG. 8 that is a component block diagram of a network computing device 800 suitable for use with various embodiments. Such network computing devices may include at least the components illustrated in FIG. 8. With reference to FIGS. 1-8, a network computing device 800 may include a processor 801 coupled to volatile memory 802 (e.g., 426) and a large capacity nonvolatile memory, such as a disk drive 803. The network computing device 800 may also include a peripheral memory access device such as a floppy disc drive, compact disc (CD) or digital video disc (DVD) drive 806 coupled to the processor 801. The network computing device 800 may also include network access ports 804 (or interfaces) coupled to the processor 801 for establishing data connections with a network, such as the Internet and/or a local area network coupled to other system computers and servers. The network computing device 800 may be connected to one or more antennas for sending and receiving electromagnetic radiation that may be connected to a wireless communication link. The network computing device 800 may include additional access ports, such as USB, Firewire, Thunderbolt, and the like for coupling to peripherals, external memory, or other devices.

Figure 9:
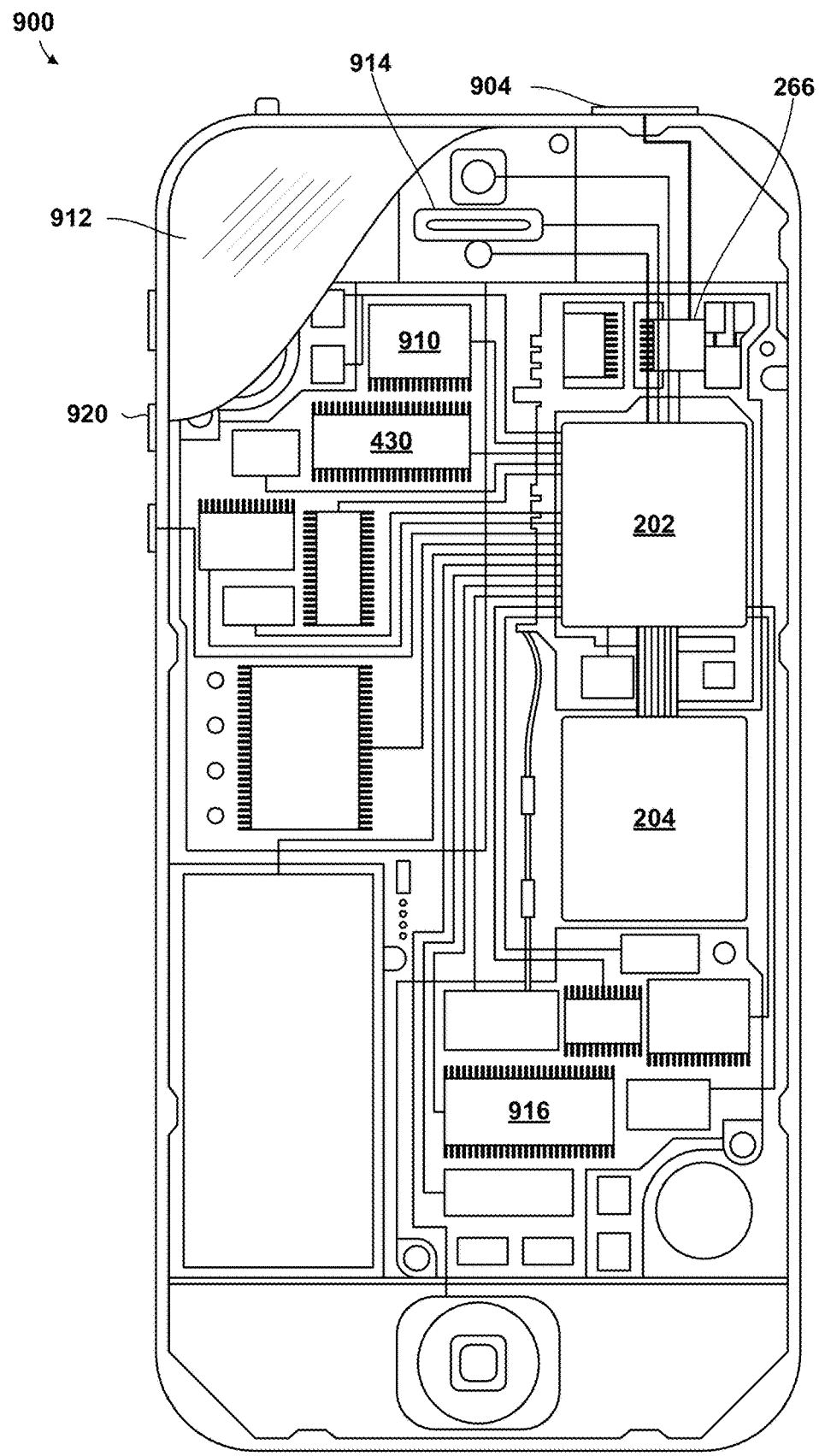
FIG. 9 is a component block diagram of a wireless device suitable for use with various embodiments.

Various embodiments, including the methods and operations 500, 520, 585, 600, 700, and 750, may be performed in a variety of wireless devices (e.g., the wireless device 120a-120e, 200, 320, 402, 404), an example of which is illustrated in FIG. 9 that is a component block diagram of a wireless device 900 suitable for use with various embodiments. With reference to FIGS. 1-9, a wireless device 900 may include a first SOC 202 (e.g., a SOC-CPU) coupled to a second SOC 204 (e.g., a 5G capable SOC). The first and second SOCs 202, 204 may be coupled to internal memory 426, 430, 916, a display 912, and to a speaker 914. Additionally, the wireless device 900 may include an antenna 904 for sending and receiving electromagnetic radiation that may be connected to a wireless data link and/or cellular telephone transceiver 266 coupled to one or more processors in the first and/or second SOCs 202, 204. The wireless device 900 may also include menu selection buttons or rocker switches 920 for receiving user inputs.

The wireless device 900 also may include a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 910 may include a digital signal processor (DSP) circuit (not shown separately).

The processors of the network computing device 900 and the wireless device 900 may be any programmable microprocessor, microcomputer or multiple processor chip or chips that can be configured by software instructions (applications) to perform a variety of functions, including the functions of the various embodiments described below. In some wireless devices, multiple processors may be provided, such as one processor within an SOC 204 dedicated to wireless communication functions and one processor within an SOC 202 dedicated to running other applications. Software applications may be stored in the memory 426, 430, 916 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 520, 585, 600, 700, and 750 may be substituted for or combined with one or more operations of the methods 500, 520, 585, 600, 700, and 750.

Implementation examples are described in the following paragraphs. While some of the following implementation examples are described in terms of example methods, further example implementations may include: the example methods discussed in the following paragraphs implemented by a computing device comprising a processor configured with processor-executable instructions to perform operations of the methods of the following implementation examples; the example methods discussed in the following paragraphs implemented by a computing device comprising means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1. A method performed by a processor of a computing device for image compression, including: determining a type of packing used for a chunk of image data; generating metadata describing the type of packing used for the chunk of image data; packing the chunk of image data according to the determined type of packing; and sending the packed chunk of image data and the metadata to a second computing device.

Example 2. The method of example 1, wherein the metadata describing the type of packing used for the chunk of image data enables the chunk of image data to be read independently of a second chunk of image data.

Example 3. The method of example 1 or example 2, wherein the metadata describing the type of packing used for the chunk of image data enables the chunk of image data to be written tiled and read linearly.

Example 4. The method of any of examples 1-3, wherein generating metadata describing the type of packing used for the chunk of image data includes generating metadata indicating whether the chunk of image data is compressed or uncompressed.

Example 5. The method of any of examples 1-4, wherein packing the chunk of image data according to the determined type of packing includes compressing the chunk of image data according to the determined type of packing.

Example 6. The method of any of examples 1-4, wherein packing the chunk of image data according to the determined type of packing includes packing the chunk of image data into one or more blocks.

Example 7. The method of example 6, wherein generating metadata describing the type of packing used for the chunk of image data includes generating metadata indicating a zone offset of a zone in which a block is grouped, and packing the chunk of image data according to the determined type of packing includes grouping the block into the zone.

Example 8. The method of example 6, wherein generating metadata describing the type of packing used for the chunk of image data includes generating metadata indicating a zone size of a zone in which a block is grouped.

Example 9. The method of example 6, wherein generating metadata describing the type of packing used for the chunk of image data includes generating metadata indicating a block offset of the one or more blocks in a zone.

Example 10. The method of example 6, wherein generating metadata describing the type of packing used for the chunk of image data includes generating metadata indicating a number of blocks in a zone.

Example 11. The method of example 6, wherein generating metadata describing the type of packing used for the chunk of image data includes generating metadata indicating a location of a header in a zone.

Example 12. The method of example 6, wherein generating metadata describing the type of packing used for the chunk of image data includes generating metadata indicating that a block header includes an offset field.

Example 13. A method performed by a processor of a computing device for image decompression, including: decoding metadata describing a type of packing used for a chunk of image data; determining the type of packing used for the chunk of image data based on the decoded metadata; and unpacking the chunk of image data according to the determined type of packing used for the chunk of image data.

Example 14. The method of example 13, wherein unpacking the chunk of image data according to the determined type of packing used for the chunk of image data includes reading the chunk of image data independently of a second chunk of image data.

Example 15. The method of either of example 13 or example 14, wherein unpacking the chunk of image data according to the determined type of packing used for the chunk of image data includes reading the chunk of image data linearly wherein the chunk of image data was written tiled.

Example 16. The method of example 15, wherein determining the type of packing used for a chunk of image data based on the decoded metadata includes identifying a block in which the chunk of image data is packed.

Example 17. The method of example 16, wherein determining the type of packing used for a chunk of image data based on the decoded metadata includes identifying a zone including the block in which the chunk of image data is packed.

Example 18. The method of example 17, wherein identifying the zone including the block in which the chunk of image data is packed includes identifying a zone offset or zone size.

Example 19. The method of example 17, wherein identifying the zone including the block in which the chunk of image data is packed includes identifying a block offset of the block in the zone.

Example 20. The method of example 17, wherein identifying the zone including the block in which the chunk of image data is packed includes identifying a number of blocks in the zone.

Example 21. The method of example 17, wherein identifying the zone including the block in which the chunk of image data is packed includes identifying a location of a block header in the zone.

Example 22. The method of example 17, wherein identifying the zone including the block in which the chunk of image data is packed includes identifying that a block header includes an offset field.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a computing device for image compression, comprising:
   determining a type of packing of each of a plurality of chunks of image data, wherein each chunk of image data of the plurality of chunks of image data comprises a linear portion of a set of image data, wherein the set of image date comprises multiple linear portions each having a uniform byte length, and at least one of the types of packing of one of the plurality of chunks of image data is tiled and another of the types of packing of one of the plurality of chunks of image data is untiled;
   generating metadata describing the type of packing used for each of the plurality of chunks of image data;
   packing the plurality of chunks of image data according to the determined type of packing of each of the plurality of chunks of image data; and
   sending the packed chunks of image data and the metadata to a second computing device.

2. The method of claim 1, wherein the metadata describing the type of packing used for each of the plurality of chunks of image data enables the chunks of image data to be read independently of each other.

3. The method of claim 1, wherein the metadata describing the type of packing used for each of the plurality of chunks of image data enables the chunks of image data to be written tiled and read linearly.

4. The method of claim 1, wherein generating metadata describing the type of packing used for each of the plurality of chunks of image data comprises generating metadata indicating whether each of the chunks of image data is compressed or uncompressed.

5. The method of claim 1, wherein packing the plurality of chunks of image data according to the determined type of packing of each of the plurality of chunks of image data comprises compressing each of the plurality of chunk of image data according to the determined type of packing for that chunk.

6. The method of claim 1, wherein packing the plurality of chunks of image data according to the determined type of packing of each of the plurality of chunks of image data comprises packing the chunks of image data into one or more blocks.

7. The method of claim 6, wherein:
   generating metadata describing the type of packing used for each of the plurality of chunks of image data comprises generating metadata indicating a zone offset of a zone in which a block is grouped; and
   packing the plurality of chunks of image data according to the determined type of packing of each of the plurality of chunks of image data comprises grouping the block into the zone.

8. The method of claim 6, wherein generating metadata describing the type of packing used for each of the plurality of chunks of image data comprises generating metadata indicating a zone size of a zone in which a block is grouped.

9. The method of claim 6, wherein generating metadata describing the type of packing used for each of the plurality of chunks of image data comprises generating metadata indicating a block offset of the one or more blocks in a zone.

10. The method of claim 6, wherein generating metadata describing the type of packing used for each of the plurality of chunks of image data comprises generating metadata indicating a number of blocks in a zone.

11. The method of claim 6, wherein generating metadata describing the type of packing used for each of the plurality of chunks of image data comprises generating metadata indicating a location of a header in a zone.

12. The method of claim 6, wherein generating metadata describing the type of packing used for each of the plurality of chunks of image data comprises generating metadata indicating that a block header includes an offset field.

13. A method performed by a processor of a computing device for image decompression, comprising:
   decoding metadata describing a type of packing used for each of a plurality of chunks of image data, wherein each chunk of image data of the plurality of chunks of image data comprises a linear portion of a set of image data, wherein the set of image date comprises multiple linear portions each having a uniform byte length, and at least one of the types of packing of one of the plurality of chunks of image data is tiled and another of the types of packing of one of the plurality of chunks of image data is untiled;
   determining the type of packing used for each chunk of image data based on the decoded metadata; and
   unpacking each of the plurality of chunks of image data according to the determined type of packing used for each of the plurality of chunks of image data.

14. The method of claim 13, wherein unpacking each of the plurality of chunks of image data according to the determined type of packing used for each of the plurality of chunks of image data comprises reading the plurality of chunks of image data independently of each other.

15. The method of claim 13, wherein unpacking each of the plurality of chunks of image data according to the determined type of packing used for each of the plurality of chunks of image data comprises reading one of the plurality of chunks of image data linearly wherein said chunk of image data was written tiled.

16. The method of claim 15, wherein determining the type of packing used for each chunk of image data based on the decoded metadata comprises identifying a block in which the chunks of image data are packed.

17. The method of claim 16, wherein determining the type of packing used for each chunk of image data based on the decoded metadata comprises identifying a zone comprising the block in which the chunks of image data are packed.

18. The method of claim 17, wherein identifying the zone comprising the block in which the chunks of image data are packed comprises identifying a zone offset or zone size.

19. The method of claim 17, wherein identifying the zone comprising the block in which the chunks of image data are packed comprises identifying a block offset of the block in the zone.

20. The method of claim 17, wherein identifying the zone comprising the block in which the chunks of image data are packed comprises identifying a number of blocks in the zone.

21. The method of claim 17, wherein identifying the zone comprising the block in which the chunks of image data are packed comprises identifying a location of a block header in the zone.

22. The method of claim 17, wherein identifying the zone comprising the block in which the chunks of image data are packed comprises identifying that a block header includes an offset field.

23. A wireless device, comprising:

a processor configured with processor executable instructions to perform operations comprising:

determining a type of packing of each of a plurality of chunks of image data, wherein each chunk of image data of the plurality of chunks of image data comprises a linear portion of a set of image data, wherein the set of image date comprises multiple linear portions each having a uniform byte length, and at least one of the types of packing of one of the plurality of chunks of image data is tiled and another of the types of packing of one of the plurality of chunks of image data is untiled;

generating metadata describing the type of packing used for each of the plurality of chunks of image data;

packing the plurality of chunks of image data according to the determined type of packing of each of the plurality of chunks of image data; and sending the packed chunks of image data and the metadata to a second computing device.

24. The wireless device of claim 23, wherein the processor is configured with processor executable instructions to perform operations such that the metadata describing the type of packing used for each of the plurality of chunks of image data enables the chunks of image data to be read independently of each other.

25. The wireless device of claim 23, wherein the processor is configured with processor executable instructions to perform operations such that the metadata describing the type of packing used for each of the plurality of chunks of image data enables the chunks of image data to be written tiled and read linearly.

26. The wireless device of claim 23, wherein the processor is configured with processor executable instructions to perform operations such that generating metadata describing the type of packing used for each of the plurality of chunks of image data comprises generating metadata indicating whether each of the chunks of image data is compressed or uncompressed.

27. The wireless device of claim 23, wherein the processor is configured with processor executable instructions to perform operations such that packing the plurality of chunks of image data according to the determined type of packing of each of the plurality of chunks of image data comprises compressing each chunk of image data according to the determined type of packing for that chunk.

28. The wireless device of claim 23, wherein the processor is configured with processor executable instructions to perform operations such that packing the plurality of chunks of image data according to the determined type of packing of each of the plurality of chunks of image data comprises packing the chunks of image data into one or more blocks.

29. The wireless device of claim 28, wherein the processor is configured with processor executable instructions to perform operations such that:

generating metadata describing the type of packing used for each of the plurality of chunks of image data comprises generating metadata indicating a zone offset of a zone in which a block is grouped, and packing the plurality of chunks of image data according to the determined type of packing of each of the plurality of chunks of image data comprises grouping the block into the zone.

30. A wireless device, comprising:

a processor configured with processor executable instructions to perform operations comprising:

decoding metadata describing a type of packing used for each of a plurality of chunks of image data, wherein each chunk of image data of the plurality of chunks of image data comprises a linear portion of a set of image data, wherein the set of image date comprises multiple linear portions each having a uniform byte length, and at least one of the types of packing of one of the chunks of image data is tiled and another of the types of packing of one of the chunks of image data is untiled;

determining the type of packing used for each chunk of image data based on the decoded metadata; and unpacking each of the chunks of image data according to the determined type of packing used for each of the chunks of image data.

* * * * *